(12) United States Patent
Pedretti

(10) Patent No.: US 9,988,122 B2
(45) Date of Patent: Jun. 5, 2018

(54) BICYCLE FRAME

(71) Applicant: Andrea Pedretti, Reggio Emilia (IT)

(72) Inventor: Andrea Pedretti, Reggio Emilia (IT)

(*) Notice: Subject to any disclaimer, the term of this patent is extended or adjusted under 35 U.S.C. 154(b) by 0 days. days.

(21) Appl. No.: 15/216,918

(22) Filed: Jul. 22, 2016

(65) Prior Publication Data

US 2017/0101152 A1    Apr. 13, 2017

(30) Foreign Application Priority Data

Oct. 8, 2015  (IT) ......................... 102015000059733

(51) Int. Cl.
*B62K 13/08* (2006.01)
*B62K 25/04* (2006.01)

(52) U.S. Cl.
CPC .............. *B62K 13/08* (2013.01); *B62K 25/04* (2013.01)

(58) Field of Classification Search
CPC ........ B62K 13/08; B62K 25/04; B62K 25/10; B62K 25/26
See application file for complete search history.

(56) References Cited

U.S. PATENT DOCUMENTS

| | | | | |
|---|---|---|---|---|
| 5,456,482 A * | 10/1995 | Rau, III | ................... | B62J 27/00 280/283 |
| 5,628,524 A | 5/1997 | Klassen et al. | | |
| 6,877,591 B1 | 4/2005 | Hso | | |
| 7,566,066 B2 * | 7/2009 | Chang | ................... | B62K 25/286 280/283 |
| 7,658,394 B1 * | 2/2010 | Huang | ................... | B62K 25/26 280/284 |
| 7,712,757 B2 | 5/2010 | Berthold | | |
| 2003/0205882 A1 * | 11/2003 | Parkin | ................... | B62K 19/16 280/281.1 |
| 2008/0258427 A1 * | 10/2008 | Buckley | ............... | B62K 25/286 280/284 |
| 2011/0187078 A1 * | 8/2011 | Higgon | .................. | B62K 25/04 280/284 |
| 2011/0227312 A1 | 9/2011 | Earle | | |
| 2013/0081273 A1 * | 4/2013 | McAndrews | ......... | F16F 9/3271 29/896.91 |
| 2013/0093160 A1 | 4/2013 | Alsop | | |
| 2013/0249188 A1 * | 9/2013 | Beale | ..................... | B62K 19/00 280/284 |
| 2014/0159338 A1 | 1/2014 | Thoma | | |
| 2015/0054250 A1 * | 2/2015 | Hu | ......................... | B62K 25/28 280/276 |

FOREIGN PATENT DOCUMENTS

| | | |
|---|---|---|
| DE | 102006046847 A1 | 5/2007 |
| EP | 2603418 A1 | 6/2013 |
| GB | 2360497 A1 | 3/2000 |
| WO | 2013029928 A1 | 3/2013 |
| WO | 2015051472 A1 | 4/2015 |

* cited by examiner

*Primary Examiner* — Tony H Winner
*Assistant Examiner* — Marlon A Arce
(74) *Attorney, Agent, or Firm* — Volpe and Koenig, P.C.

(57) ABSTRACT

A bicycle frame (100) includes: a front triangle (110); a rear frame (130) articulated to the front triangle (110); a body (21) associated to the front triangle (110) and mobile with respect thereto; and a bottom bracket (22) rotatably associated to the body (21) about a first rotation axis (B). The rear frame (130) is articulated to the body (21) about a second rotation axis (C) parallel to the first rotation axis (B).

15 Claims, 14 Drawing Sheets

BICYCLE FRAME

TECHNICAL FIELD

The present invention relates to a vehicle frame, in particular a mountain bike or trekking bike frame.

In particular, the invention relates to a variable-geometry bicycle frame.

BACKGROUND

A modern cross country bicycle, or mountain bike, destined to be ridden in much-varying conditions, usually comprises: a pair of knobby tires mounted on thick-spoke rims having a large diameter; a pair of damped front forks, a front triangle and a rear frame, the latter two constituting the bicycle frame, where the rear frame is hinged to the front triangle with the interposing of a rear shock absorber.

The front triangle is constituted by three tubes which form the triangle: a horizontal top tube, a vertical seat tube and an oblique down tube. The saddle post is located in the intersection between the top tube and the seat tube, the saddle post usually being a hollow cylindrical support in which the saddle support is inserted.

The steering tube is located at the other end of the top tube, where it intersects the down tube, the steering tube being a cylindrical cavity which enables housing a steering stem associated to the fork and relative bearings.

A handlebar is associated to the steering stem, the handlebar enabling control of the steering of the front wheel.

A hollow cylindrical seating is present in the intersection between the seat tube and the down tube for housing the bottom bracket, being a device that comprises the spindle to which the crank set is fixed, i.e. the assembly of the cranks and the cogged front chainwheel.

The other component of the frame is the rear frame, which is constituted by a first fork to the stays of which, at the open end of the fork, the free end of the stays of a second fork is fixed; the intersection thereof forms an acute angle and the intersection also affords the holes that function as a seating for a rotation spindle of the rear wheel.

The opposite end to the free end of the first fork is usually hinged to the front triangle in the bottom bracket zone, while the closed end of the second fork is hinged to the front triangle at a point usually below the saddle and above the intersection point between the saddle tube and the down tube. The stays of the first fork are known as lower chain stays, while the stays of the second fork are termed higher chain stays.

In this way the frame can be conceived as a union of a front triangle which forms the main frame and a second triangle which forms the rear frame of the suspension, hinged to one another and between which a shock absorbing element is interposed, though other geometries are conceivable.

On varying the ride conditions, which range from steep descents to sharp ascents, the distribution of the load between the front wheel and the rear wheel changes radically. When riding on flat terrain about 70% of the weight bears on the rear wheel and only the remaining 30% bears on the front wheel. Differently, when riding uphill, almost 100% of the weight force unloads on the rear wheel, leaving the front wheel with a very light load, and capable of lifting from the ground even with only minimum stresses. On the contrary, when riding downhill, it can happen that almost 100% of the weight force is concentrated on the front wheel, a situation that can lead to a raising, even an involuntary one, of the rear wheel.

In recent decades, the evolution and popularity of off-road cycling practices in courses featuring varied terrain have led manufacturers to develop specialized bicycles conceived for facilitating downhill or uphill rides, appropriately suiting the frame geometries to these specific ride situations.

In particular, bicycles designed for facilitating the uphill ride have geometries designed so as to optimize the balancing of the weight force in order to facilitate partial displacement of the rear wheel towards the front wheel, by adopting a more vertical steering tube and a saddle post that is more vertical with respect to the bottom bracket. These bicycles, developed with the objective of making uphill pedaling more efficient, assume the characteristic of having a smaller distance between the bottom bracket and the spindle of the front wheel, the containing of which facilitates the displacement of the weight on the front wheel, and makes the bicycle easier to handle.

Vice versa, bicycles developed with the aim of maximizing downhill performance include opposite bicycle geometries, i.e. they facilitate, thanks to a less vertically-inclined steering angle and a saddle post further back with respect to the vertical of the bottom bracket, a substantially retracting of the center of gravity towards the rear wheel, facilitating the downhill rideability of the bicycle and limiting the tendency of the rear wheel to detach from the ground in the steepest descents. Structurally these bicycles are also characterized by a distance between the bottom bracket and the spindle of the front wheel that is greater than that of uphill bicycles, making them more stable on rough terrain, but less easy to handle.

A further feature distinguishing the two different types of above-described bicycles is the height of the bottom bracket. Downhill bicycles in fact have bottom brackets positioned lower with the aim of lowering the center of gravity of the assembly constituted by the bicycle with a cyclist on board.

Positioning the bottom bracket as low as possible is always useful from the point of view of the handling and stability of the bicycle, but there is a limit given by the need to be able to pedal even in the presence of obstacles on the course without the pedals touching the obstacles; in downhill bicycles the need to pedal is limited, so it is possible to position the bottom bracket lower with respect to a normal mountain bike.

If an analysis is made with reference to a downhill bicycle, the characteristics lead to having a bicycle that enables the cyclist to feel at ease in the descent; on the other hand the mountain bike realized in this way is hard to exploit when on flat terrain or when moving uphill. For example the combination of the bicycle geometries, highly specialized, with the use of suspensions having a long travel, means having a bicycle that bounces during pedaling, so that much of the energy from the pedaling action is lost and, given an equal force applied, progress is slower.

For these reasons, a downhill rider is often led to use mechanical means, for example trucks and/or cable cars, in order to reach a point in which to begin the descent; this, among other things, limits the use of these bicycles to places that can be reached by road or cable car.

Prior art solutions exist that enable varying some of the geometric heights of the frame or the rear suspension of the bicycles, in order to make the bicycle adaptable to both descent and ascent, by adapting the frame to the course that the rider is to ride.

With reference to the U.S. Pat. No. 7,712,757, a Mountain Bike is known to be constituted by a stiff element which constitutes the main frame and by a rear frame connected thereto by means of a hinge system provided with a shock absorbing element. The shock absorbing element (shock-absorber) is connected via a rotating pin with the rear frame by a first rocker link. The second (and lower) anchoring point of the shock-absorber is pivoted to the down tube of the main frame by means of an intermediate element. The intermediate element, or second rocker link, functions as a housing for the bearing of the main joint, on which the rear frame is pivoted. Therefore the main rocker link of the rear frame (lower chain stay) is not connected directly to the main frame, but is connected thereto indirectly via a connecting element. Further, the described structure in the above-cited patent is provided with an elastic element arranged between the connecting element (second rocker link) and the saddle tube, which by means of a contraction/extension thereof enables displacing the connecting element and with it the lower anchoring point of the main shock absorbing element (shock-absorber). Configured in this way the solution enables the anchoring point to displace autonomously forward and backward under the effect of the tension of the chain exerted at the time of pedaling (forwards when force is exerted on the pedals and backwards during the step of compression and/or braking without the action of the pedals. The constraints of dependence on the damping behavior of the rear suspension with respect to the tension of the chain are however often negatively perceptible by the cyclists, and as such make these systems open to discussion. This is true in particular during off-road riding, when the rear frame, subjected to frequent and extreme stresses by the roughness of the terrain, frequently displaces. Further, the overall rigidity of the frame is reduced due to the presence of an additional damping element during movement.

Further, the solution described in this patent requires significant displacements of the lower anchoring point of the shock absorbing element, in the order of 40-50 mm, in order to enable the system to have a significant effect in terms of variation of the geometric heights and the functioning of the suspension, large displacements that lead to a solid design of the mobile elements at the cost of a reduced rigidity of the whole, and also lead to a destabilization of the bicycle during pedaling, making the ride less precise as these variations are not predictable and not controllable by the cyclist.

There exists a further solution described in U.S. Pat. No. 6,877,591, in which in order to change the position of the second anchoring point of the shock absorbing element to the down tube of the frame a second fixing element is used that can be fixed to the down tube in different positions. This fixing position can be varied only by demounting the fixing pin of the mobile element to the frame with suitable tools and remounting it in a different position. By doing this the anchoring point of the shock absorbing element can be varied, but this operation is made uncomfortable by the need to use tools and in that this cannot be done during the ride.

Further, the arrangement of a shock absorbing element between a front triangle and a rear frame is known from patent GB 2 360 497. In this solution the anchoring of the shock-absorber to the rear frame does not occur by means of a rocker link connection but is realized directly. The second anchoring of the shock absorbing element is positioned directly on the down tube of the front triangle. In order to change the geometry of the frame, the first anchoring point of the shock-absorber on the rear frame can be displaced internally of an appropriately profiled ride guide. As with the preceding reference the limitation of this solution is the necessity of using tools for carrying out the operation, as well as the fact that it cannot be done while the vehicle is being ridden.

A further solution is known from patent EP No. 2603418, which includes a mechanism able to vary the position of the upper attachment of the shock absorbing element with respect to the rocker link, of the rear suspension. In this solution the shock absorber is indirectly connected to the rear frame via a rocker link pivoted on the saddle tube of the front triangle. The variation of the upper attachment point of the shock absorber on the rocker link, which is made possible by means of a remotely-actuatable hydraulic system activated by a command on the handlebar, enables varying some geometric heights of the frame on which it is installed. However, this variation varies the overall position of the front triangle with respect to the rear frame, inducing a variation of equal measure on both the angle of inclination of the steering tube and on the angle of inclination of the saddle post (the front triangle being fixed). Further this variation has no significant impact on the wheel base (the distance between the spindle of the rear wheel and the spindle of the front wheel), enabling a partial adaptation of the bicycle geometry to the changing ride situations.

The problem of this solution therefore lies in the fact that the variation in the configuration obtainable by acting only on the attachment position of the rear suspension is limited, and therefore, though there are benefits, the difficulty of using a bicycle for uphill riding that was conceived for downhill use is only minimally mitigated.

Other prior art example are described in documents US 2011/227312, WO 2015/051472, US 2013/093160 and U.S. Pat. No. 5,628,524, but in all these prior art solutions there is no provision for the bottom bracket to be displaced with respect to the main frame and, further, the allowed variation of the bicycle geometry is always free and unblocked when the bicycle is running.

An aim of the present invention is to obviate the above-mentioned drawbacks of the prior art, with a solution that is simple and rational.

The aims are attained by the characteristics of the invention as reported in the independent claim. The dependent claims delineate preferred and/or particularly advantageous aspects of the invention.

DESCRIPTION OF THE INVENTION

An embodiment of the invention, in particular, discloses a bicycle frame comprising: a front triangle; a rear frame articulated to the front triangle; a body associated to the front triangle and mobile with respect thereto; for example associated slidably with respect to the front triangle (on the lie plane thereof) and/or associated rotatably with respect thereto about a first axis of revolution (perpendicular to the lie plane thereof), a bottom bracket rotatably associated to the body about a first rotation axis, wherein the rear frame is articulated to the body about a second rotation axis parallel to the first rotation axis.

With this solution a frame is provided that, with a modification of the relative position of the rear frame and the bottom bracket, therefore the pedals with respect to the front triangle, can vary the bicycle geometry for adapting to the course the bicycle is going to take, in a simpler and more effective way with respect to the known solutions.

As mentioned in the foregoing, the body may be a revolving body, which revolving body is rotatably associated to the front triangle about a axis of revolution, the first rotation axis and the second rotation axis being singly parallel and offset with respect to the axis of revolution.

With this solution, the displacement of the revolving body, i.e. the rotation axes of the rear frame and the bottom bracket, is fulfilled in a compact, rational and functional way.

It is however possible that the body can alternatively be a slider that is translatable with respect to the front triangle, for example mobile between an advanced position and a retracted position with respect thereto, along any trajectory, on which the second and third rotation axes are positioned. For example, the body can be articulated to the front triangle by means of two connecting rods defining a four-bar linkage (namely a planar four-bar linkage), preferably a parallelogram linkage, the hinge axes of which are all parallel to the first rotation axis.

In a further aspect of the invention, the body (for example the revolving body or the slider) can be mobile (in oscillation and/or sliding) alternatively between a first stop position and a second stop position (for example angular, in the case of a revolving body).

In this way, the frame is selectively operable between a configuration that is more suitable for downhill courses and a configuration that is more favorable for pedaling and, therefore, more suitable for flat or uphill courses.

In a further aspect of the invention, the frame can comprise activating means (i.e. an actuator) able to move, i.e. rotate or translate, the body (i.e. respectively the revolving body or the slider) with respect to the front triangle between the first stop position and the second stop position.

With this solution, the movement between the first and the second stop position is made more simply and rapidly, and is for example automatable or controllable from remote by using an actuator preferably positionable on the handlebar so as to be able to activate it without distracting the attention of the cyclist from the ride.

In a further aspect of the invention, the frame can comprise blocking means (for example a blocking group) configured to stop the motion (for example the rotation or the translation) of the body (with respect to the revolving body or the slider) in at least one of the first stop position and the second stop position and any intermediate position therebetween.

In this way it is possible to shift, and thereafter block, the body in any position comprised between the first stop position, which changes the bicycle geometry so as to make the bicycle more suitable to a descent, and the second stop position, which changes the bicycle geometry in order to have a bicycle response more appropriate for an ascent or flat sections.

In a further aspect of the invention, the second rotation axis can preferably (but not limitedly) coincide with the first rotation axis.

In this way, by superposing the attachment point of the bottom bracket and the rear frame to the body, a compact solution is provided, having a smaller weight and enabling use of a revolving body having smaller dimensions.

In a further aspect of the invention, a first link can be interposed between the body (i.e. the revolving body or the slider) and the rear frame, which first link is hinged to the body, for example with respect to the first rotation axis.

With this solution a favorable transmission of the forces of the rear frame to the rear suspension is guaranteed.

In a further aspect of the invention, the frame can comprise a saddle post articulated to the body (i.e. to the revolving body or the slider) rotatably about a fourth rotation axis, for example parallel and offset with respect to the first rotation axis and, in a case in which the body is a revolving body as described in the foregoing, the fourth rotation axis can be parallel and offset with respect to the first axis of revolution.

With this solution it is possible to intervene directly on the value of the saddle angle, obtaining a variation of the bicycle geometry that is more incisive with respect to the variation of the attachment point of the rear frame and the bottom bracket only. A change in the angle of the saddle post greater than the change of the angle of the tube is preferable for compensating the retracting of the bottom bracket due to the displacement (i.e. to the rotation or the sliding) of the body (respectively the revolving body or the slider) between the first stop position and the second stop position, so as to make it efficient for the pedaling action and the position of the cyclist also in the second stop position and in the infinite intermediate positions between the first and the second position. Further, the change in the attachment point of the saddle post is advantageously done using the same device to which the rear frame and the bottom bracket are connected, which enables obtaining a simple and compact solution.

In a further aspect of the invention, a second link can be interposed between the saddle post and the body (i.e. the revolving body or the slider), which second link is hinged to the body about the fourth rotation axis.

In a further aspect of the invention, the saddle post can be swinging associated to the front triangle about a first swinging axis parallel to the first rotation axis (and for example the first axis of revolution) and offset with respect thereto.

In a further aspect of the invention, the frame can comprise a shock absorbing element interposed between the front triangle and the rear frame, wherein the shock absorbing element is arranged to damp the oscillations of the rear frame with respect to the front triangle.

In this way rough terrains can be undertaken while guaranteeing the rideability of the vehicle and a certain level of comfort.

In a further aspect of the invention, the shock absorbing element comprises a fluid-dynamic cylinder provided with a cylindrical body and a slider that is slidable with respect to the cylindrical body, wherein one of the cylindrical body and the slider is hinged to the body (i.e. the revolving body or the slider) or to the front triangle about a fifth rotation axis.

In this way it is possible to directly intervene on the attachment position of the shock absorbing element to the frame, so as to vary the relative inclination thereof and make the response more suitable for pedaling in an ascent or for absorbing of the rough surface vibrations on the terrain in descent.

In a further aspect of the invention, the fifth rotation axis can coincide with the fourth rotation axis.

With this solution, by superposing the point of rotation of the saddle post and the shock absorbing element on the body (i.e. the revolving body or the slider), a compact solution is provided, having a modest weight and enabling use of a body (i.e. a revolving body or a slider) having contained dimensions.

In a further aspect of the invention, the other of the slider and the cylindrical body of the shock absorbing element can be articulated to the rear frame.

In a further aspect of the invention, the rear frame can be hinged to the "fluid-dynamic" cylinder by a third link, for example a rocker link, rotatably associated, in an intermediate point thereof to the front triangle about a sixth rotation axis parallel and offset with respect to the fifth rotation axis (and to for example the first rotation axis), and hinged, in points of the third link opposite with respect to the intermediate point, respectively to the rear frame and the shock absorbing element.

However other geometries can be conceived for the suspensions, which include a shock absorbing element hinged directly to the rear frame.

BRIEF DESCRIPTION OF THE DRAWINGS

Further characteristics and advantages of the invention will emerge from a reading of the following description, provided by way of non-limiting example with the aid of the figures illustrated in the appended tables of drawings.

DETAILED DESCRIPTION OF THE PREFERRED EMBODIMENTS

Figure 1:
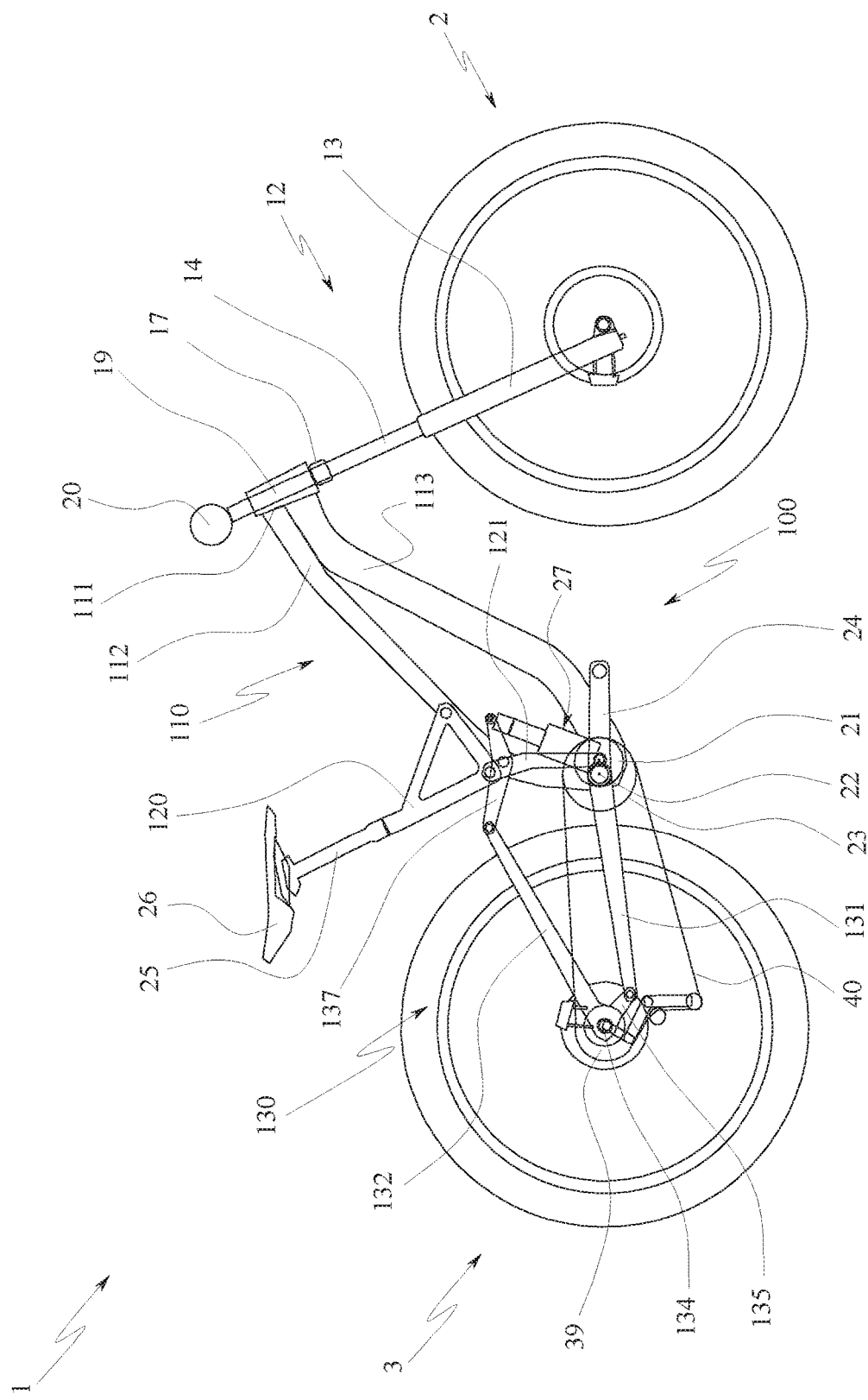
FIG. 1 is a lateral view of a bicycle provided with a frame according to the invention, with body in a first position.
Figure 2:
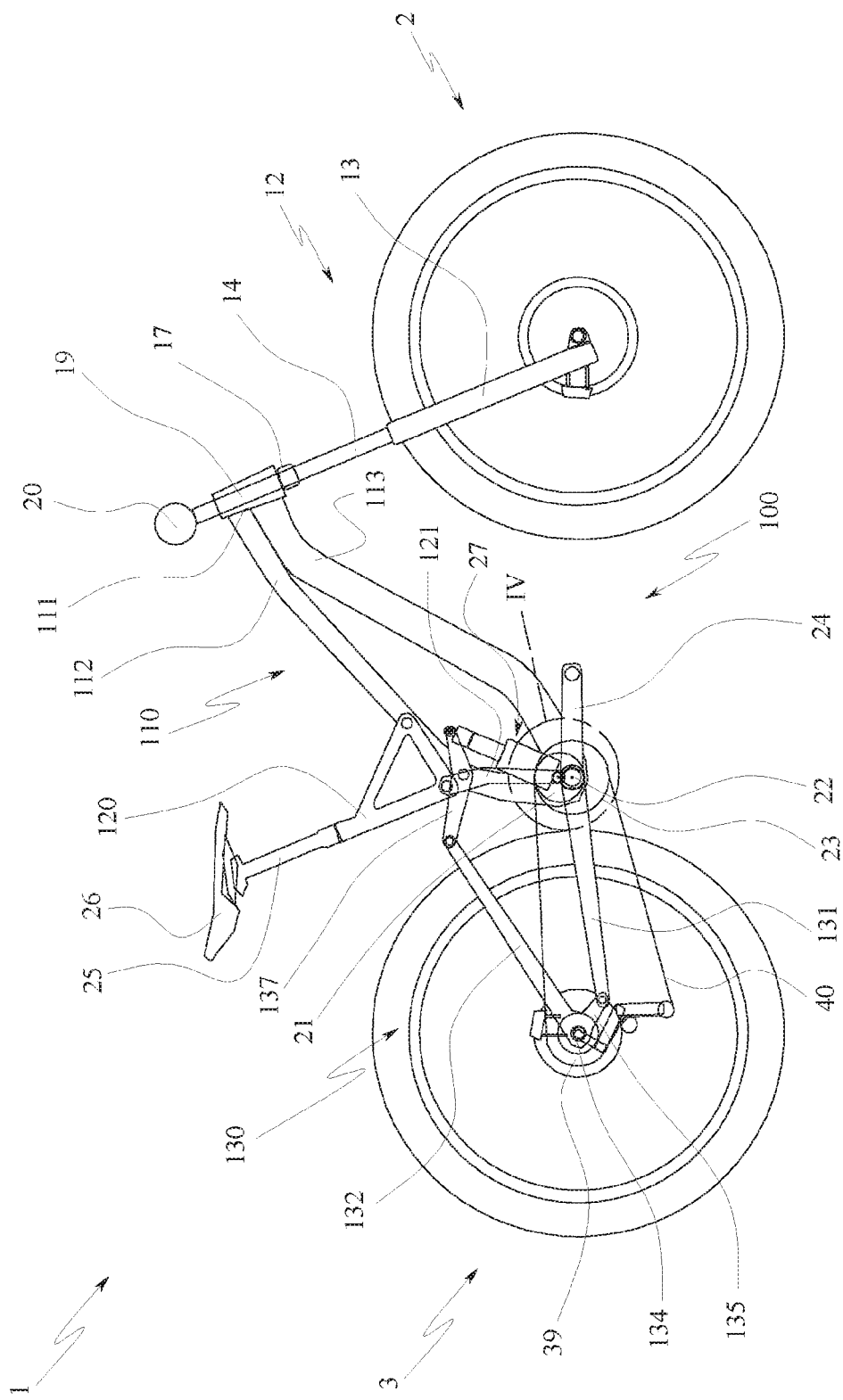
FIG. 2 is a lateral view of the bicycle of FIG. 1, with the body in a second position.
Figure 3:
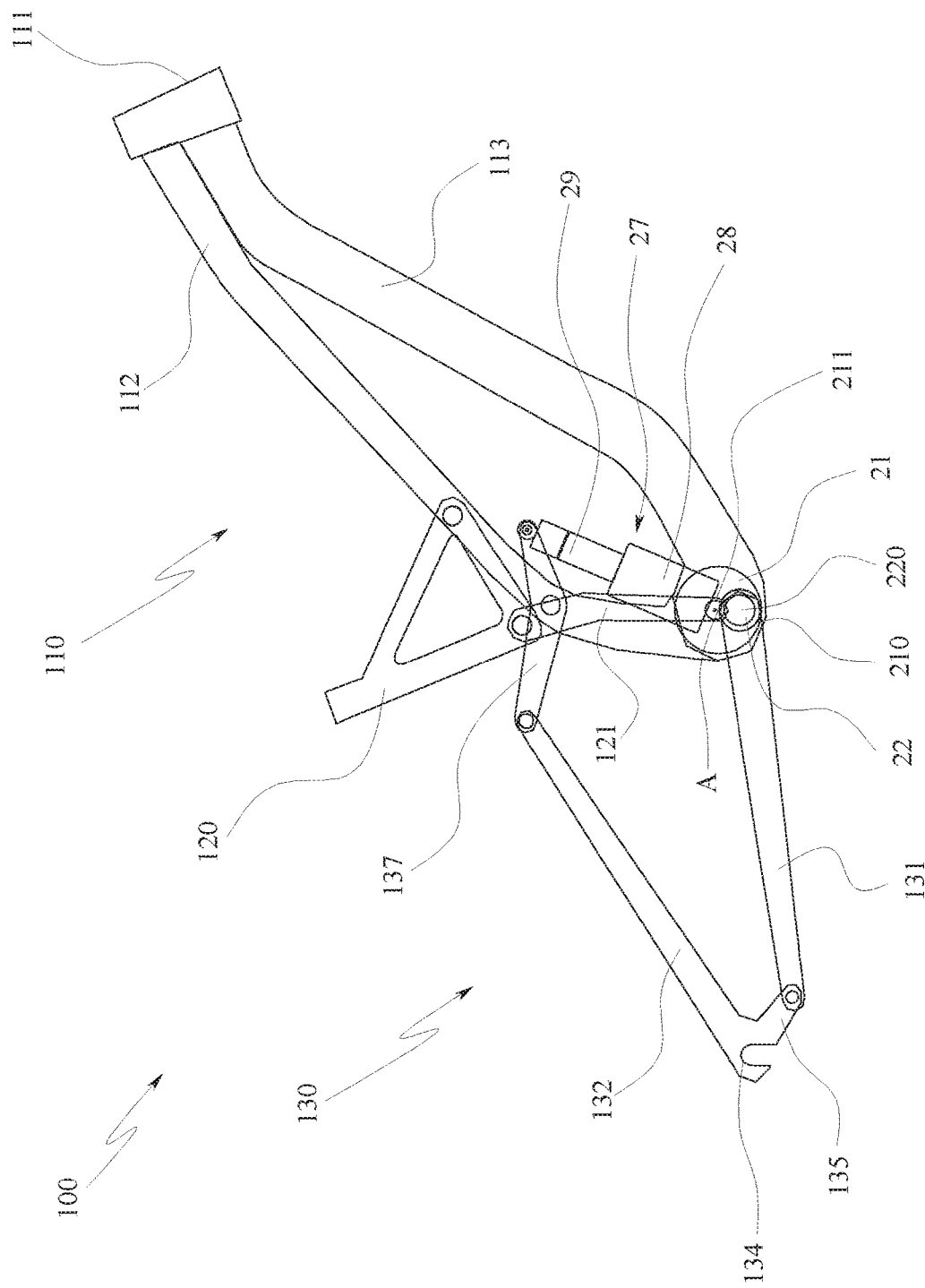
FIG. 3 is a lateral view of the bicycle frame in FIGS. 1 and 2.
Figure 4:
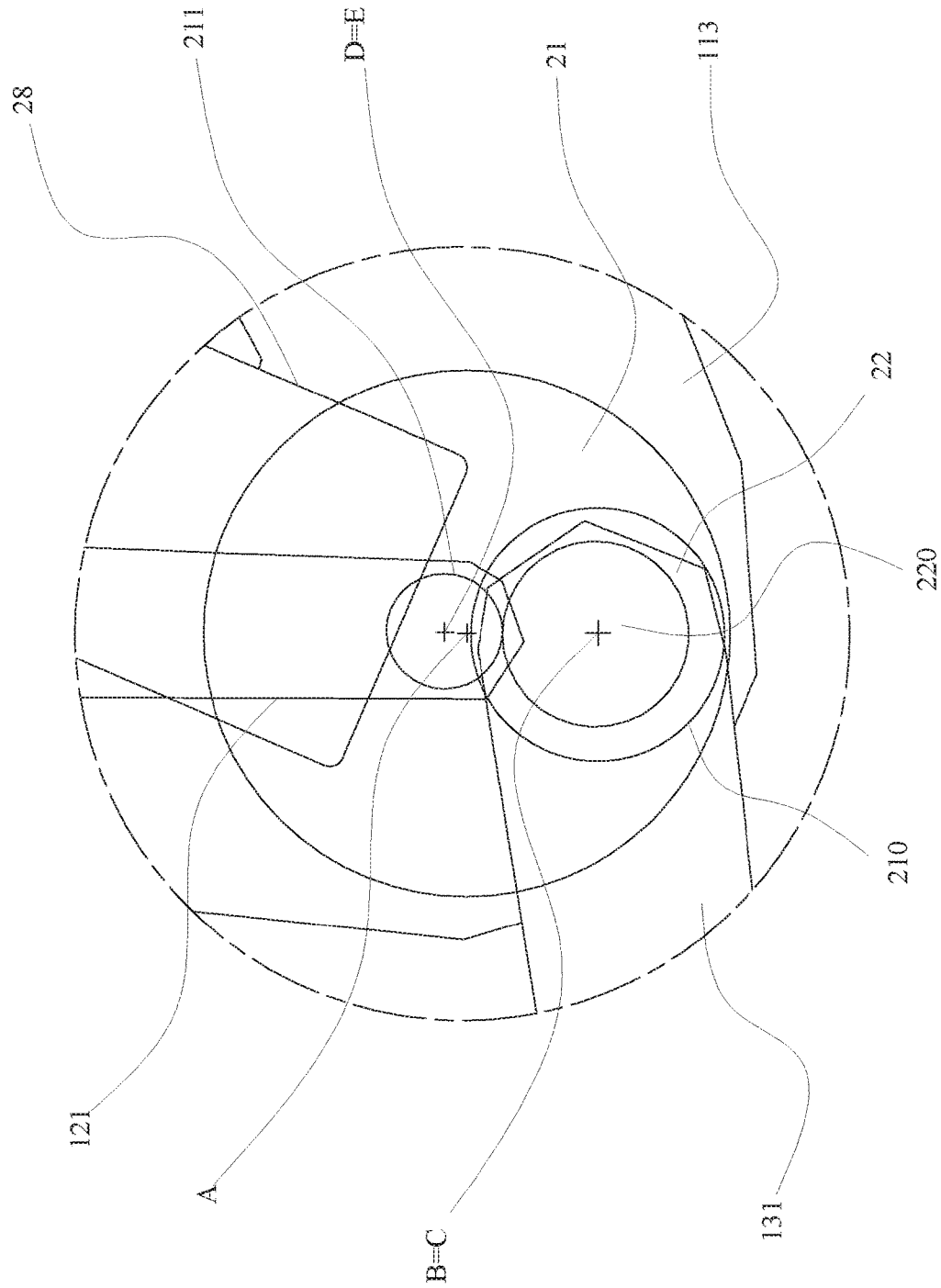
FIG. 4 is a larger-scale view of a detail of FIG. 2.

With particular reference to the figures, reference numeral 1 denotes a bicycle, which is provided with a frame 100.

The frame 100, which will be completely described in the following, comprises a front triangle 110, for example substantially rigid.

The front triangle 110 illustrated in the example comprises a steering tube 111 located frontally with respect to the advancement direction of the bicycle 1 and arranged to support a front wheel 2.

The front triangle 110 further comprises an upper tube 112 and a lower tube 113, which are joined to the steering tube 111 at a respective end thereof and are joined to one another at a respective opposite end thereof distal from the steering tube 111.

Figure 10:
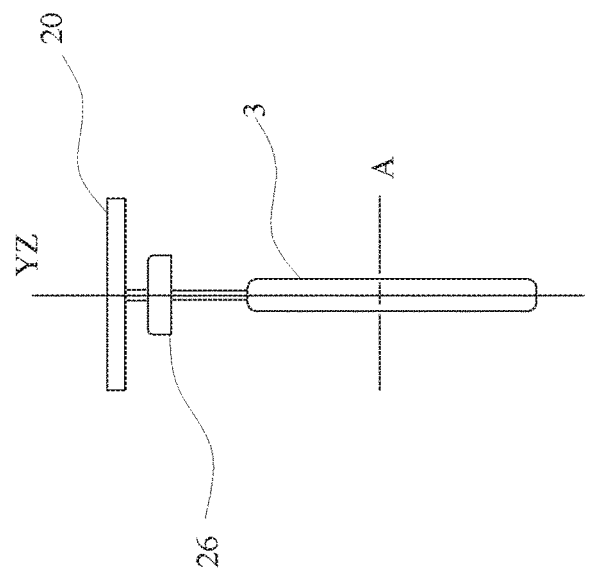
FIG. 10 is a schematic representation of a rear view of the bicycle.
Figure 10:
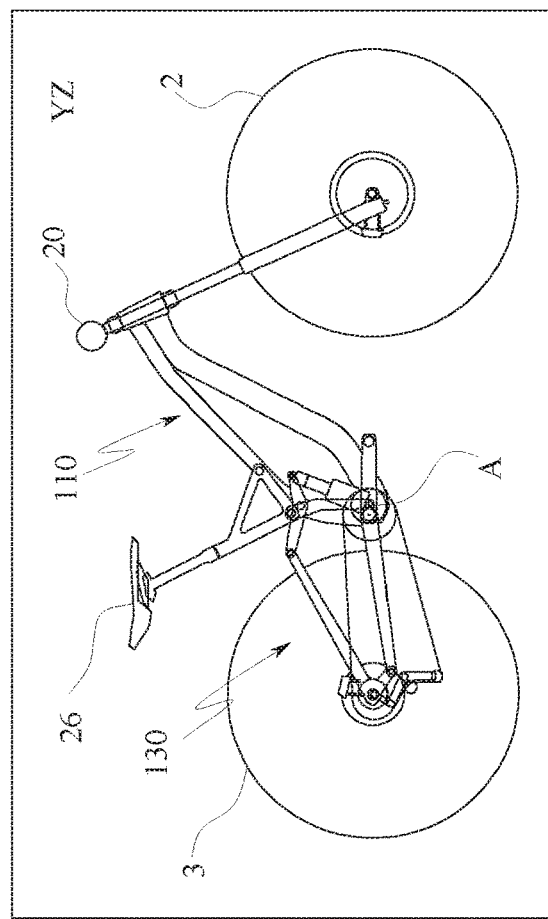

The upper and lower tubes 112, 113, as well as the steering tube 111, have central axes lying on a plane YZ, for example substantially vertical in the figures (for example in FIG. 10).

The front triangle 110, for example, is made in a single body, in this case the upper and lower tubes 112, 113 and the steering tube which constitute the front triangle 110 are made of a single body or of three welded bodies.

The upper tube 112 has, for example, a curved longitudinal extension, with a concavity facing towards the front wheel 2 i.e. downwards, which is able to stiffen the structure of the frame 100 against stresses directed towards the ground.

The lower tube 113 also has for example a curved longitudinal extension (for example S-shaped) suitable to stiffen the body of the frame 100.

Figure 5:
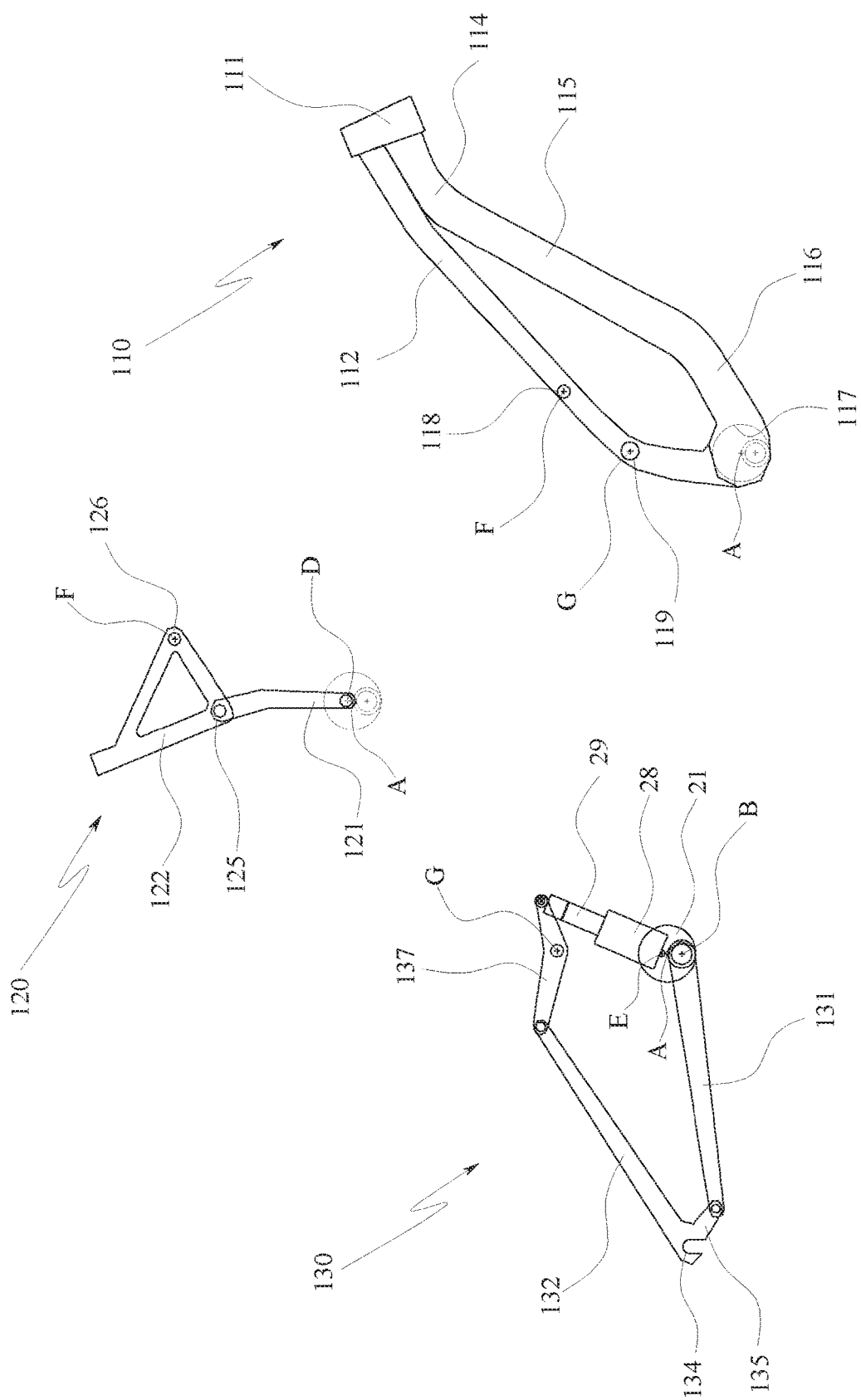
FIG. 5 is a lateral view of the components of the frame present in FIG. 3.
Figure 6:
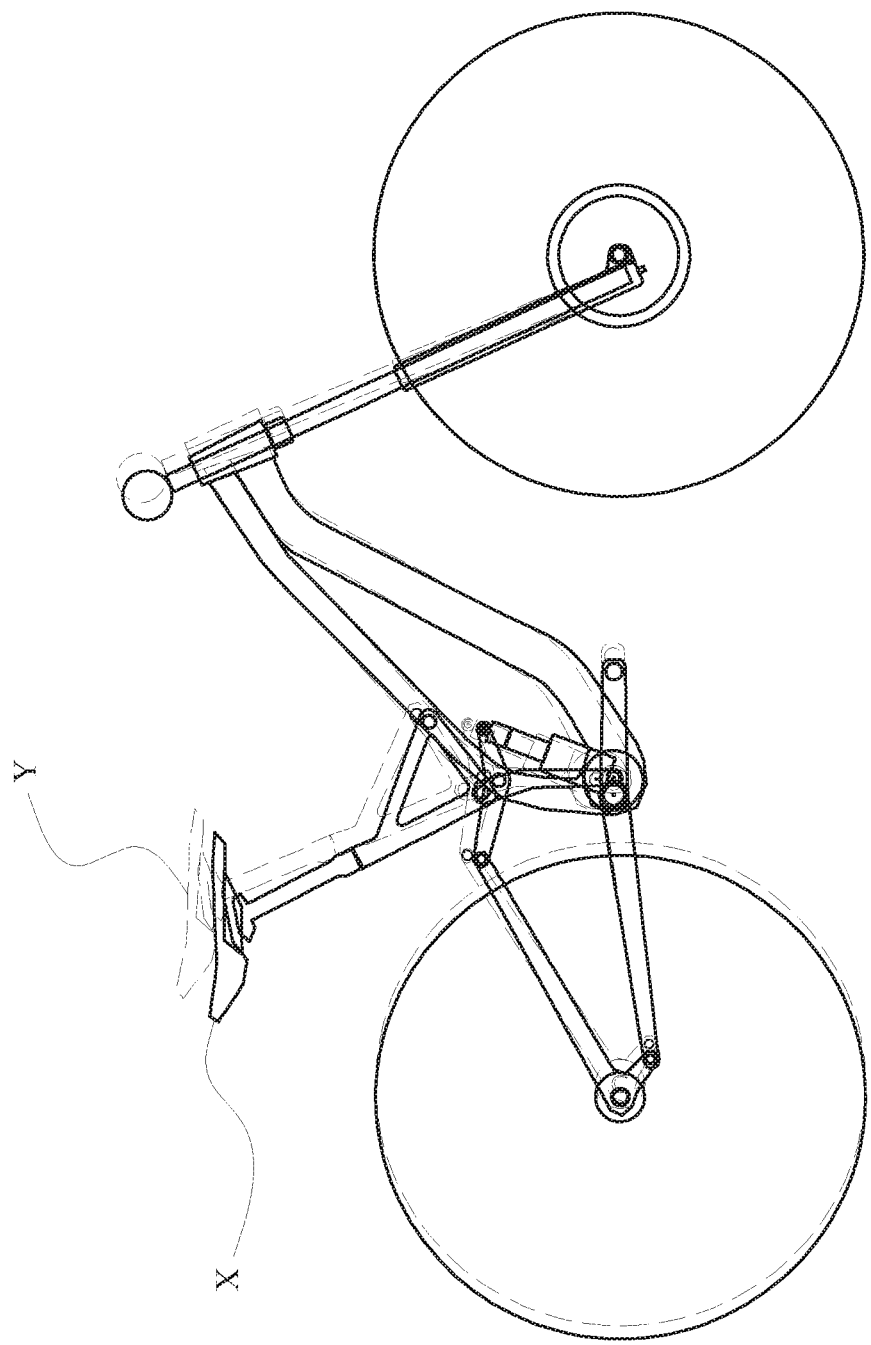
FIG. 6 is a schematic superposing of FIGS. 1 and 2.
Figure 7A:
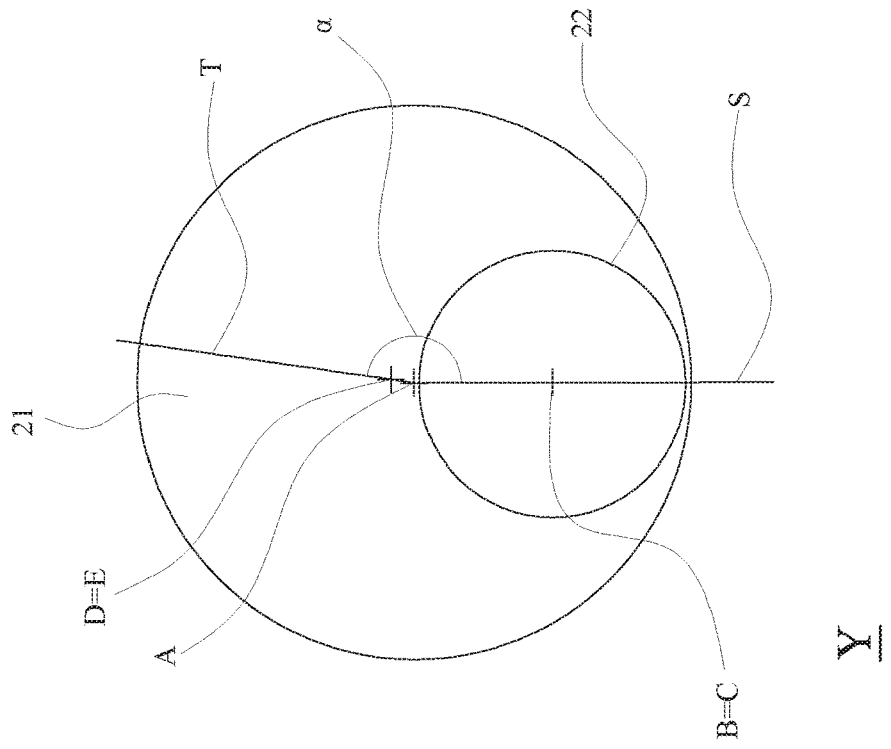
FIGS. 7A and 7B are each a schematic representation of the body respectively in the two positions of FIGS. 1 and 2.
Figure 7B:
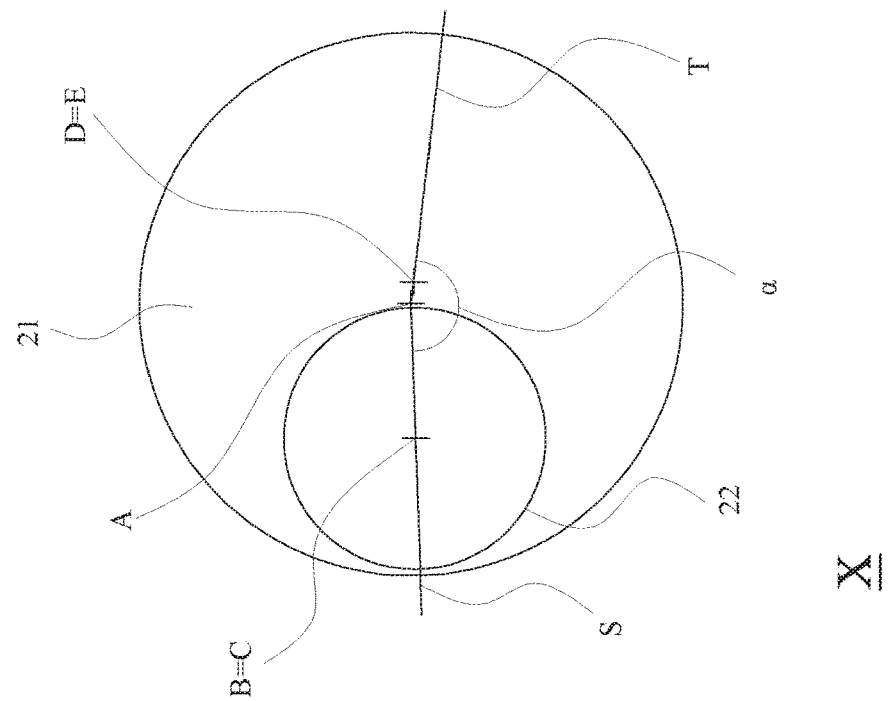

With particular reference to FIG. 5, the lower tube 113, for example, further comprises a first end part 114 associated to the steering tube 111 and having a curved profile with a concavity facing towards the front wheel 2, an intermediate part 115 substantially straight and a curved second end part 116, which is solidly constrained to the end of the upper tube 112 opposite to the end thereof associated to the steering tube 111.

The front triangle 110 comprises a first cylindrical seating 117, for instance a through-seating, having an axis perpendicular to plane YZ.

The first seating 117 is for example positioned in the connection zone between the lower tube 113 (i.e. the second end part 116) and the upper tube 112.

The first seating 117 can house or be associated with a bottom bracket 22 as will be more fully described in the following.

The front triangle 110 comprises a second cylindrical seating 118 (for example a through-seating), for instance smaller than the first seating 117, wherein the second cylindrical seating 118 has an axis perpendicular to plane YZ and is positioned at an intermediate part of the upper tube 112.

The front triangle 111 further comprises a third cylindrical seating 119, for instance a though-seating, wherein the third cylindrical seating 119 has an axis that is perpendicular to plane YZ and is positioned at an intermediate part of the upper tube 112, for example interposed between the first seating 117 and the second seating 118.

The frame 100 comprises a body 21, which is movably associated, for example rotatably and/or slidably, to the front triangle 110, for example to the first seating 117 thereof, as will be more fully described in the following.

The body 21 comprises a first cylindrical housing 210 having an axis, for instance, perpendicular to plane YZ.

The bottom bracket 22 comprises a rotation spindle 220, which supports at opposite ends two opposite cranks 24 each supporting a respective pedal (not illustrated as of known type).

The rotation spindle 220 of the bottom bracket 22 is housed, coaxially and substantially fit, internally of the first housing 210 of the body 21, and is rotatably associated thereto about a first rotation axis B i.e. coinciding with the axis of the first housing 210.

In a first embodiment shown in FIGS. 1-10, the body 21 (and therefore the rotation spindle 220) can be inserted with its axis perpendicular to the plane YZ (i.e. parallel to the axis of the first seating 117) into the first seating 117 of the front triangle 110.

The rotation spindle 220 is inserted into the first seating 117 in an offset position by interposition of the body 21, also said eccentric link, or of a slider configured to translate along a trajectory (any) on plane YZ.

In the example illustrated in FIGS. 1-10, the body 21 is a revolving body, i.e. the body 21 is rotatably associated to the front triangle 110 around a first axis of revolution A perpendicular to the plane YZ parallel and offset with respect to the first rotation axis B.

In a first embodiment shown in FIGS. 1-10, the body 21 is a cylindrical body inserted, substantially fit, in the first seating 117 and rotatably associated thereto around the first axis of revolution A, i.e. coinciding with the axis of the first seating 117.

The body 21 is therefore rotatably associated (for example by means of the interposition of proper bearings) to the front triangle 110 about the first axis of revolution A, perpendicular to plane YZ.

One (or more) front chainwheel 23 is solidly constrained to the rotation spindle 220, as is known to the skilled person in the art.

The distance between the first rotation axis B and the first axis of revolution A is, for instance, 5-40 mm, preferably 20 mm.

The frame 100, in all the embodiments shown in the FIGS. 1-14, further comprises a saddle post 120 (wherein the central axis of the saddle post 120 lies on the plane YZ) arranged to support a support stem 25 (height-adjustable with respect to the saddle post 120, as known to the skilled person in the art) which in turn supports a saddle 26.

The saddle post 120 is, for instance, swinging associated to the front triangle 110 about a first swinging axis F perpendicular to plane YZ, i.e. parallel to the first rotation axis B and/or to the first axis of revolution A.

For example, the first swinging axis F coincides with the axis of the second seating 118, in practice the saddle post 120 is hinged to the front triangle 110 by means of a hinge pin inserted, substantially fit, in the second seating 118.

The saddle post 120 is further articulated, by means of a second link 121, to the body 21.

The second link 121, in practice, is hinged to the saddle post 120 about a third rotation axis parallel and offset with respect to the first swinging axis F (for example in a flanked position thereto with respect to the direction defined by the saddle post 120 i.e. by the support stem 25).

In the example, the saddle post 120 is formed by a triangular frame, a main side 122 of which is substantially hollow with a cylindrical cavity for inserting the support stem 25.

The second link 121 is hinged to the saddle post 120 in a point 125 aligned with the main side 122 thereof and positioned below to the same main side 122t, the first swinging axis F is instead, for example, located in proximity of the corner 126 of the saddle post 120 opposite to the main side 122.

The second link 121, is further rotatably associated to the body 21 about a fourth rotation axis D, parallel and offset with respect to the first axis of revolution A (and/or the first rotation axis B).

In practice, the fourth rotation axis D is constituted by a rotation spindle inserted substantially fit in a second cylindrical housing 211 located in the body 21, for example in an offset position with respect to the first housing 210 and the first axis of revolution A thereof with respect to the front triangle 110.

The fourth rotation axis D can for example be distant by 2-15 mm, preferably 6 mm, from the first axis of revolution A.

An angle α comprised between an imaginary plane S including the first axis of revolution A and the first rotation axis B and an imaginary plane T including the first axis of revolution A and the fourth rotation axis D and, for instance, comprised between 90° and 270°, preferably comprised between 160° and 180°, for example equal to 170°.

For example, the angle α faces the front-bottom zone of the bicycle 1.

The second link 121 can for example have a curved profile having a concavity facing towards a rear zone (the rear wheel assembly) of the bicycle 1 opposite the front wheel 2.

The frame 100 further comprises a rear frame 130 associated to the front triangle 110 on the opposite side with respect to the steering tube 111.

In the example the rear frame 130 is articulated, as will be more fully described in the following, to the front triangle 110 about a second rotation axis C.

For example, the rear frame 130 can for example be constituted by a rear fork 132, the arms of which are positioned (symmetrically) on opposite sides with respect to the plane YZ, so as to be arranged to laterally embrace a rear wheel 3 as will be more fully described in the following, and a pair of chain stays 135 each prolonging a rear end of the arms of the rear fork 132.

The longitudinal axis of each chain stay 135 forms, with the respective arm of the rear fork 132, an acute angle facing towards the front of the bicycle 1, i.e. towards the front triangle 110 (or the front wheel 2).

Each chain stay 135 is preferably made in a single body with the respective arm of the rear fork 132.

A through-slot 134 is defined at the join zone between each arm of the rear fork 132 and the respective chain stay 135, which through-slot 134 has a through-axis that is perpendicular to the plane YZ, wherein the through-slot 134 can be cylindrical and laterally closed or open (for example downwards). The through-slots 134 have through-axes that are aligned to one another.

The rear frame 130, for example each of the chain stays 135 thereof, is articulated to the body 21.

In the example, the free end of each chain stay 135 is articulated, for example by an interposing of a first link 131 (even if it is possible for it to be hinged directly i.e. without the interposing of the first link 131), to the body 21, about hinge axes perpendicular to the plane YZ.

In a further embodiment the rear frame 130 can be articulated to the body 21 by means of a further revolving body; the further revolving body can be rotatably associated to the front triangle 110 by means of a further axis of revolution (offset with respect to the first axis of revolution A) and can be hinged to the rear frame 130 about a hinge axis parallel and offset with respect to the further axis of revolution; the further revolving body is, then, rotated with respect to the further axis of revolution thereof by the rotation of the body 21 about the first axis of revolution A; for this purpose, between the body 21 and the further revolving body may be interposed means for transmitting the movement, such as for example a link, a gearing or the like.

In greater detail, each first link 131 has a rear end hinged, about an axis perpendicular to plane YZ, to one of the chain stays 135 and an opposite front end hinged to the body 21, about a second rotation axis C (perpendicular to plane YZ) parallel and offset with respect to the first axis of revolution A and/or parallel to the first rotation axis B.

In an advantageous but not limiting way, the second rotation axis C coincides with the first rotation axis B, in practice the first link 131 is hinged to the body 21 about the same hinge axis constraining the bottom bracket 22 and the body 21.

For instance, each first link 131 may have a substantially straight longitudinal axis and is arranged on opposite sides with respect to the plane YZ so as to be suitable to laterally flank the rear wheel. In the example, the first link 131 has a length substantially equal to the inter-axial distance between the bottom bracket 22 and the slots 134 (except for the length, very limited and shorter than the length of the first links 131) of the chain stay 135, so as to obtain a geometry of the rear of the bicycle 1 of the Horst Link type.

Further, the rear frame 130, i.e. the rear forks 132 thereof, is articulated to the front triangle 110, for example to the upper tube 112.

In the example, the free ends of each arm of the rear fork 132 join in a forking point (located above the rear wheel 3) and are hinged, for instance by the interposition of a third link 137, namely a rocker link 137, to the upper tube 112 of the front triangle 110, with respect to a hinge axis that is perpendicular to the plane YZ (even if, as an alternative, the free ends may be directly hinged to the upper tube).

In greater detail, each third link 137 (or rocker link) has a rear end that is hinged, about an axis perpendicular to the plane YZ, to the ends of the rear fork 132 and each third link 137 (or rocker link) is hinged at an intermediate point thereof (forward with respect to the rear end) to the upper tube 112 about a sixth rotation axis G (perpendicular to the plane YZ), which for example coincides and is formed by the axis of the third seating 119 made in the upper tube 112.

The third link 137 (rocker link), for example, has a substantially curved longitudinal extension, for example is V-shaped, with a concavity facing upwards (for example towards the saddle 26) or downwards according to the configurations.

In the example the sixth rotation axis G is positioned near the vertex (the lower vertex) of the third link 137.

The bicycle 1 further comprises a shock absorbing element 27, interposed between the front triangle 110 and the rear frame 130 so as to damp the reciprocal oscillations with respect to the respective hinge axes.

The shock absorbing element 27 comprises for example a hydraulic cylinder or a pneumatic cylinder provided with a body 28 and a slider 29 slidable along the body 28 between an extracted position and a retracted position.

At least one of the slider 29 and the body 28, in the illustrated example the slider 29, is hinged (about a hinge axis perpendicular to the plane YZ) to the third link 137 (rocker link), for example at the free front end thereof (i.e. opposite to the rear end hinged to the rear forks 132 about the sixth rotation axis G thereof).

The other one of the body 28 and the slider 29, in the example the body 28 (for example the end thereof opposite to the slider 29) is rotatably associated (about a hinge axis perpendicular to the plane YZ) to the body 21, for example rotatably about a fifth rotation axis E parallel and offset with respect to the first axis of revolution A and/or the first rotation axis B, or to the front triangle 110.

In particular the fifth rotation axis E can for example coincide with the fourth rotation axis D, in practice the shock absorbing element 27 is hinged to the body 21 with respect to the same hinge axis that constrains the second link 121 to the body 21.

The body 21 can be rotated (for example rotated about the first axis of revolution A) with respect to the front triangle 110 between two stop positions X and Y, for example predefined, which configure two respective configurations of the bicycle 1 with different bicycle geometry.

For example, the rotation of the body 21 with respect to the front triangle 110 can be commanded by automatic activating means, i.e. by an actuator, in this way enabling variation of the bicycle geometry while the bicycle 1 is running, or manually.

For example the body 21 can be stopped in these stop positions X and Y or in any position that is intermediate there-between, for example manually (for example by means of blocking organs which selectively block the body 21 in one of the two permitted positions) or semi-automatic, as will be more fully described in the following.

The bicycle 1, in the example illustrated in FIGS. 1-10, can comprise an (automatic) actuator of the body 21, enabling the rotation of the body 21 with respect to the first axis of revolution A between a first stop position X, in which the bicycle geometry of the bicycle 1 is suitable for being ridden along courses prevalently in descent (downhill riding), and a second stop position Y, in which the bicycle geometry of the bicycle 1 is more favorable for pedaling and therefore prevalently for uphill courses.

In order to pass from the first stop position X to the second stop position Y, the actuator rotates the body 21 about the first axis of revolution A, for example substantially by 90°, in an anticlockwise direction, while in order to pass from the second stop position Y to the first stop position X the actuator enables the body 21 to perform a corresponding rotation about the first axis of revolution A substantially in an opposite direction.

In the first stop position X (FIGS. 1 and 7A), for example the first rotation axis B (and the second rotation axis C) is positioned rearward with respect to the first axis of revolution A, which is positioned rearward to the fourth rotation axis D (and the fifth rotation axis E).

In the second stop position Y (FIGS. 2 and 7B), the first rotation axis B (and the second rotation axis C) is positioned downward with respect to the first axis of revolution A, which is positioned downward to the fourth rotation axis D (and to the fifth rotation axis E).

For example, by actuating the body 21 in a clockwise rotation the first rotation axis B precedes by the angle α the fourth rotation axis D, in this way when the body 21 rotates from the second stop position Y to the first stop position X the horizontal component of the variation of the saddle post 120 (i.e. the saddle 26) position has the same direction as the horizontal component of the displacement of the bottom bracket 22.

In this way, the contemporary advancing or drawing back of the saddle 26 and the bottom bracket 22 guarantees the correct relative positioning between the saddle 26 and pedals for an effective pedaling angle for the cyclist.

The bicycle 1 further comprises a blocking group of the body 21, arranged to block the body 21 in the first stop position X or in the second stop position Y or in any intermediate position between these stop positions X and Y.

A remote command can for example be associated to the actuator and the blocking group, enabling activation and regulation of the actuator and the blocking group from remote, for example by means of activating a command positioned in proximity of the steering column 111 or the handlebar 20. It is possible, however, that the command associated to the actuator and the blocking group may be positioned in proximity of the commanded member, namely the body 21.

Further, the actuator and the blocking group can be included in a single device which enables both the actuating and the blocking of the body 21, with respect to the front triangle 110, in a determinable reciprocal position.

The actuator and the blocking group can be of different types according to constructional, design, weight and cost requirements.

In a first embodiment illustrated in FIG. 9 and FIGS. 11-14, the actuator and the blocking group, for example, comprise a hydraulic/pneumatic cylinder 30, for example double-acting, or a gas spring or a pneumatic spring.

The hydraulic/pneumatic cylinder 30 can be constituted by a slider 31, having a piston 32 at an end thereof, slidably associated to a cylinder 33.

For example, one of the cylinder 33 and the slider 31 is hinged to the body 21 (for example in an offset position with respect to the first axis of revolution A) and the other one is hinged to the front triangle 110.

In this case the slider 31 is biased by pneumatic action, by the action of a fluid, for example a gas (compressible), from a retracted configuration to an extracted configuration from the cylinder 33.

The hydraulic/pneumatic cylinder 30 is provided with the blocking group, for example positioned at the slider 31, preferably at the distal end thereof from the cylinder 33, wherein the blocking group is selectively operable between a stop position, in which it stops the sliding of the slider 31 in a determined axial position thereof (interposed between the retracted configuration and the extracted configuration, which are included) with respect to the cylinder 33, and an unblocked position, in which it frees the sliding of the slider 31 with respect to the cylinder 33. The blocking group comprises for example a lever 31*a*, for example a choke lever, rotatably coupled to the slider 31 and operable in rotation by a predetermined angle for commutating the slider from the stop position to the unblocked position, for example via an extension organ (such as a Bowden cable, not illustrated) and an activating lever connected, for example, to the handlebar 20.

Figure 8:
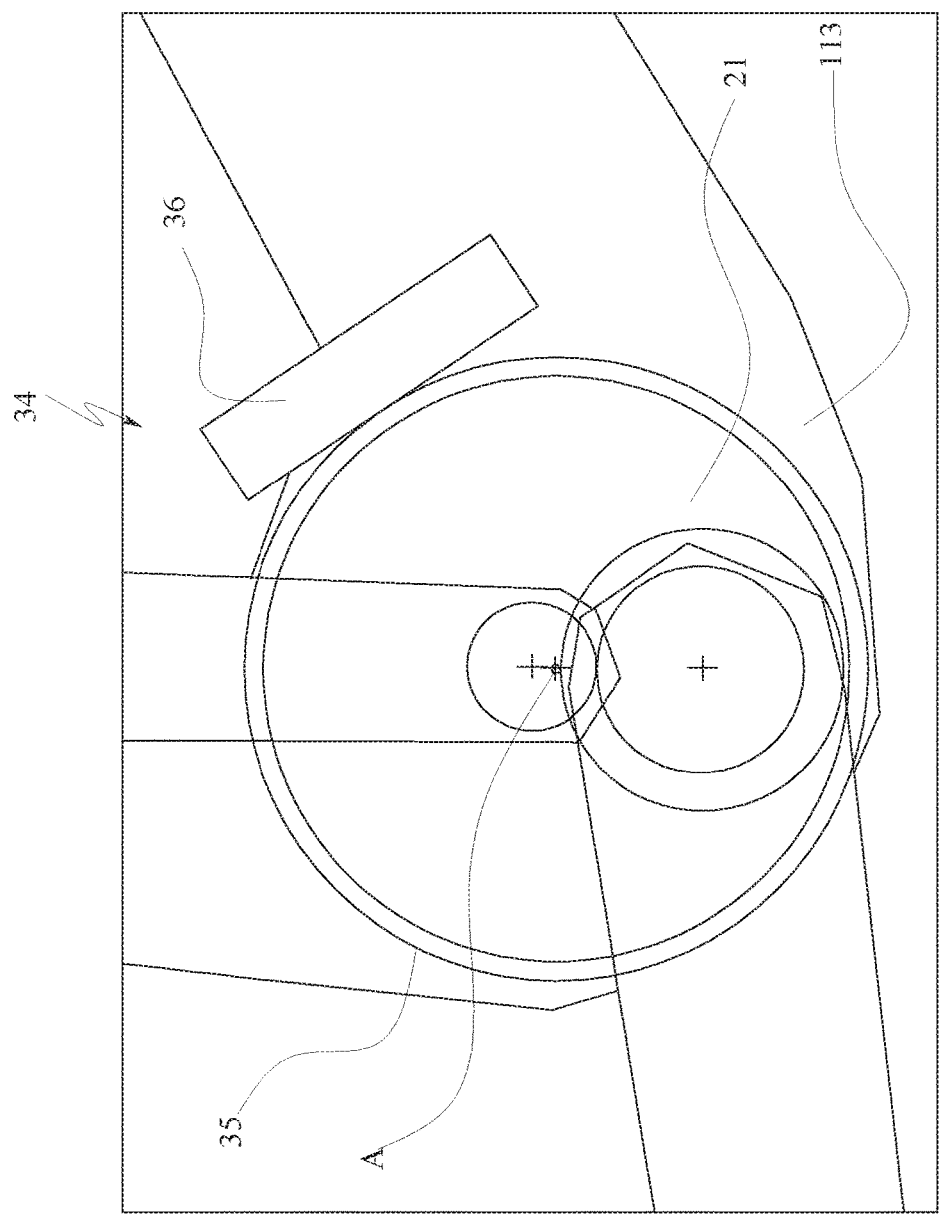
FIG. 8 is a first embodiment of activating and blocking means of the body.
Figure 9:
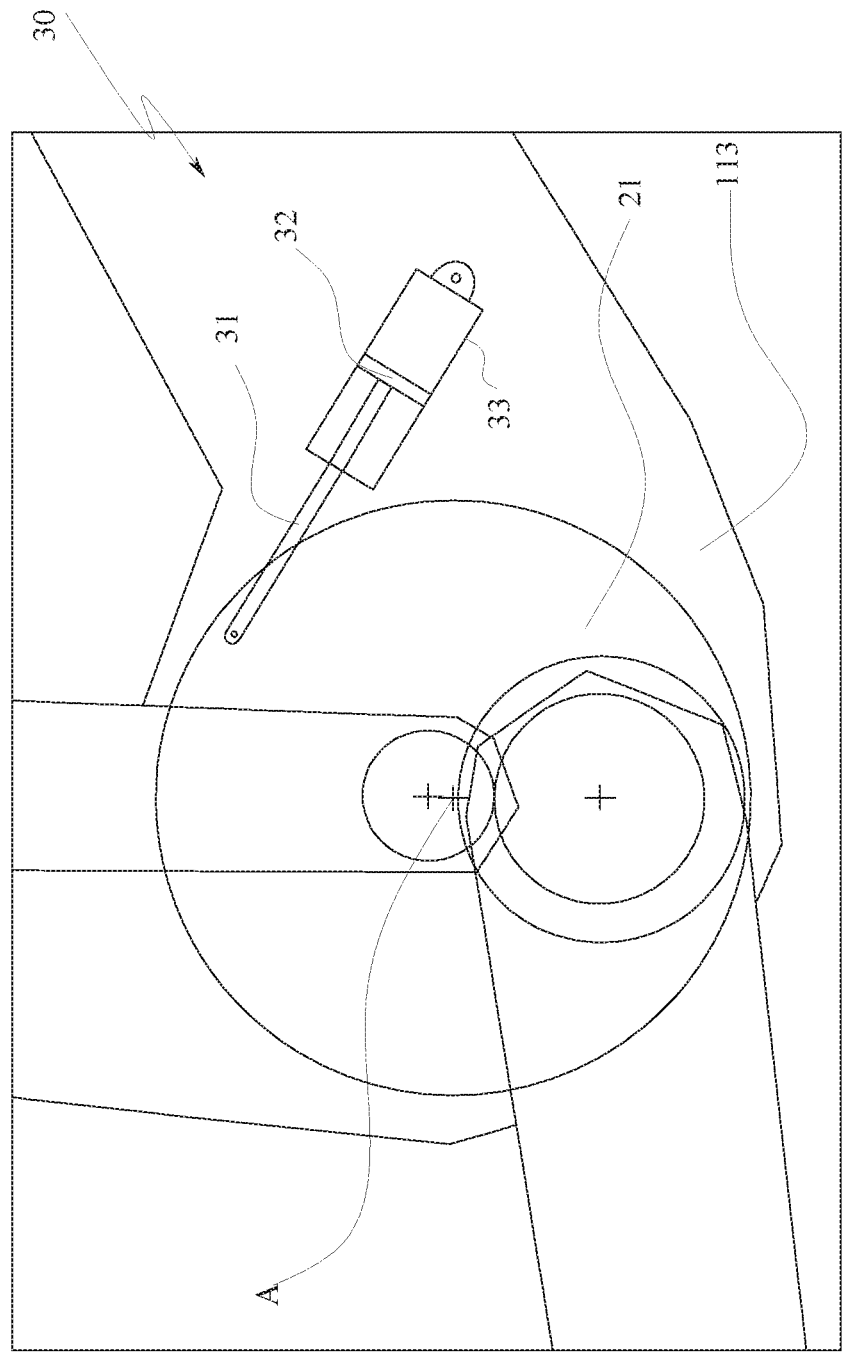
FIG. 9 is a second embodiment of the activating and blocking means of the body.

In an alternative embodiment shown in FIG. 8, the actuator and the blocking group, for example, comprise a worm screw reducer 34.

The worm screw reducer 34 can be provided with an externally-cogged wheel 35 solidly and coaxially associated to the body 21, which is activated by a worm screw 36 (for example having an axis parallel to plane YZ) which enmeshes the external cogging 35 of the wheel.

It is possible, in an alternative embodiment, for the actuator and the blocking group to comprise either a rotating piston or a rotary actuator piston or a parallel-piston actuator or even a ball-circulating system, or a hybrid system combining the above.

The bicycle 1 further comprises a front fork 12, for example suspended, to which the front wheel 2 is associated.

In the illustrated example the front fork 12 comprises a pair of parallel stays 13 and a pair of sliders 14 able to slide in the stanchions 13.

The front fork 12 further comprises a lower steering plate 17 which connects the sliders 14 to a steering stem 19 parallel to the sliders 14, which is rotatably inserted in the steering tube 111.

A handlebar 20 is associated to the upper portion of the steering stem 19 which projects from the steering tube 111 on the opposite side to the front fork 14 sliders, which handlebar 20 can be gripped by a cyclist for enabling him/her to control the steering of the front wheel 2.

Lastly, the rear wheel 3 completes the bicycle 1.

The rear wheel 3 has a rotation spindle defining the rotation axis thereof which is perpendicular to the plane YZ (i.e. parallel to an offset with respect to the first rotation axis B) and is rotatably inserted (and blocked transversally) internally of the slots 134 of the rear frame 130.

A rear derailleur 39 is further associated to the rear wheel 3 provided with a plurality of coaxial pinions drawn in rotation by a chain 40 looped about one of the pinions and the front chainwheel 23.

The frame 100, i.e. the front triangle 110, the saddle post 120, the rear frame 130 (and relative links 121, 131, 137) can be realized in any material that is sufficiently light and rigid, such as for example aluminum, carbon, titanium or the like.

Up to this point a case has been described in which the body 21 is a cylindrical body contained in the first seating 117, but it is also possible, however, that in a simplified embodiment the body 21 might be defined by a rigid body of any shape (for example and I, L, Y or X shape or other embodiments) which is hinged or articulated, by means of at least a pin or a lever having a rotation axis coinciding with the first axis of revolution A, to the first seating 117 (which can be smaller than the first seating configured to house the body 21), for example in a central or intermediate point of the body and which, therefore, has at least an offset portion to which other elements of the frame 100 can be hinged, for example the rear frame 130 and/or the bottom bracket 22 and/or the saddle post 120, for example as described in the foregoing for the main embodiment.

Figure 11:
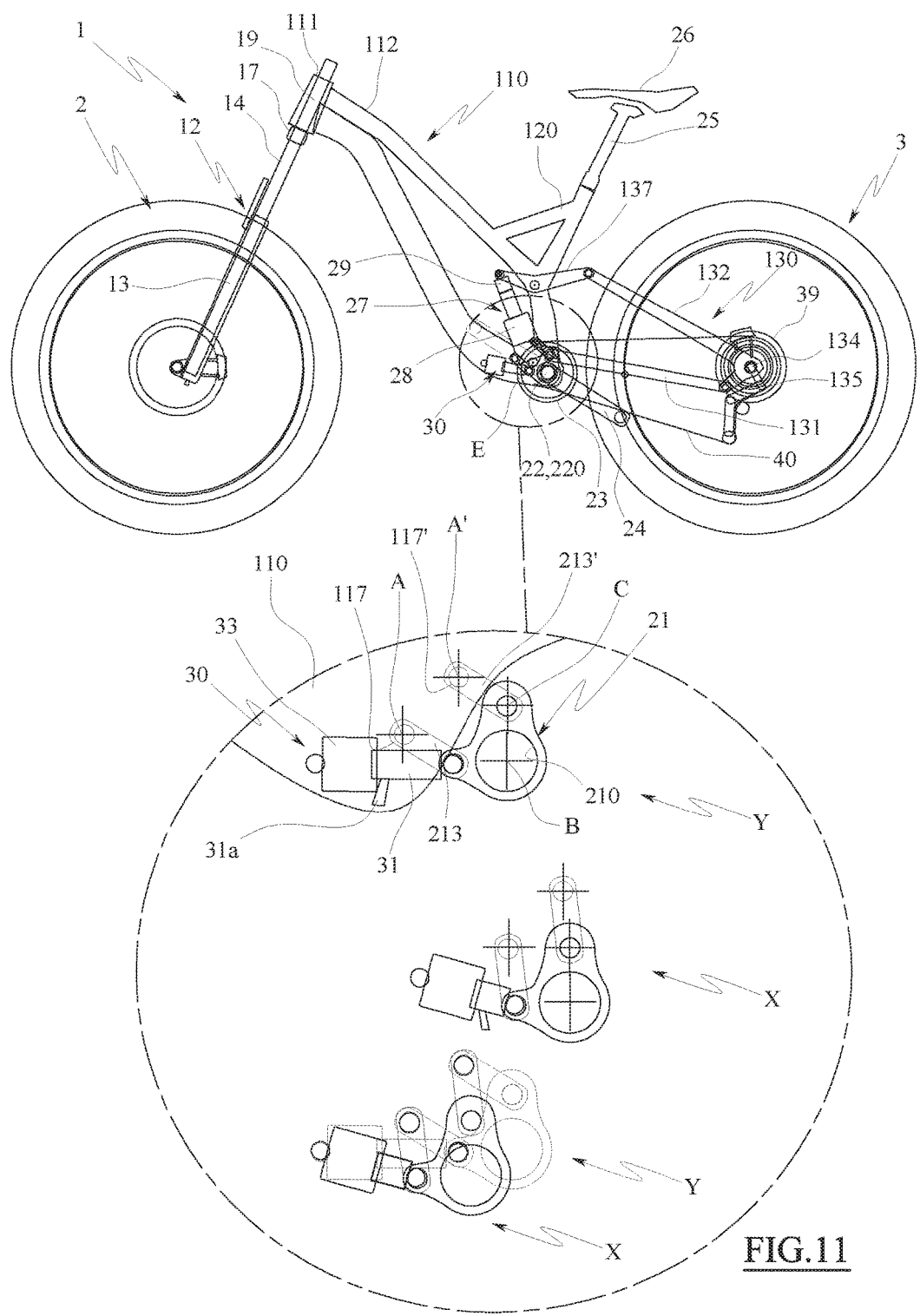
FIG. 11 is a schematic view (provided with larger-scale representations relating to the zone of the bottom bracket) of a preferred embodiment of a bicycle according to the invention.

A preferred embodiment of the frame 100 of the bicycle 1, which differs from the above-described embodiments mainly because of the shape of the body 21 and the connection thereof to the front triangle 110, is illustrated in FIG. 11.

All the parts having the same reference numeral are identical to those described in the foregoing or have equal or equivalent functions and, even if all the constructional details described in the foregoing in relation to the bicycle 1 are not literally reproduced in the following, they can be considered to be comprised in this preferred embodiment, as illustrated in FIG. 11.

In particular, the body 21 comprises the cylindrical first housing 210, in which the axis thereof forms the first rotation axis B of the bottom bracket 22 (as described in the foregoing) and is perpendicular to the plane YZ.

The rotation spindle 220 of the bottom bracket 22 is housed, coaxially and substantially fit, internally of the first housing 210 of the body 21, and is rotatably associated thereto with respect to the first rotation axis B coinciding with the axis of the first housing 210.

In the illustrated example, the body 21 is movably articulated to the front triangle 110 by means of a planar four-bar linkage, preferably a parallelogram linkage. In particular, the body 21 is articulated to the first triangle 110 by means of a pair of connection rods 213, 213', each of which is hinged to the body 21, with respect to respective rotation axes parallel to one another and parallel and offset with respect to the first rotation axis B, and to the front triangle 110, as described in the following.

A connection rod 213 of the pair of connection rods 213, 213' is hinged (by means of an appropriate rotation pin) to the first seating 117 about the first axis of revolution A. The front triangle 110 further comprises a cylindrical further first seating 117' (parallel and offset with respect to the first seating 117) to which the other connection rod 213' of the pair of connection rods 213, 213' is hinged (by means of a further rotation pin) about a further first axis of revolution A' parallel and offset with respect to the first axis of revolution A.

The body 21 is therefore configured so as to tilt (or translate) with respect to the front triangle 110 between two stop positions X and Y, for example predefined, which configure two respective configurations of the bicycle 1 with different bicycle geometry. In the example the first stop position X configures a front (and lower) stop of the body 21 and the second stop position Y configures a rear (and upper) stop of the body 21.

For example, the front triangle 110 can comprise abutting elements, for example damped, able to come into contract with the body 21 so as to constitute the stops in the stop positions X, Y.

The actuator and the blocking group are interposed between the front triangle 110 and the body 21 for operating the body 21 between the first stop position X and the second stop position Y, for example towards one of the two stop positions X and Y, and the blocking of the body 21 in any position between the first stop position X and the second stop position Y or any intermediate position there-between. In the illustrated example the actuator and the blocking group are defined by the hydraulic/pneumatic cylinder 30 as illustrated above for the embodiment of FIG. 8, in which one of the cylinder 33 and the slider 31 (the cylinder 33 in the example) is hinged (with respect to a hinge axis parallel to the first rotation axis B) to the front triangle 110 and the other one of the slider 31 and the cylinder 33 (the slider 31 in the example) is hinged to the body 21 (with respect to a hinge axis parallel to the first rotation axis B), for example coinciding with the hinge point of one connection rod 213 of the pair of connection rods 213, 213' with the body 21.

The rear frame 130, i.e. the front end of the first link 131 hinged to the body 21, can be articulated to the body 21, rotatably with respect to the second rotation axis C, parallel (and offset) with respect to the first rotation axis B, for example coinciding with the hinge point of the other connection rod 213' of the pair of connection rods 213, 213' with the body 21.

For example, the rigid body 21 might be constituted by a plate substantially having a Y-shape, i.e. provided with a first arm, a second arm and a third arm, which branch in opposite directions from a single common intersection point.

Figure 12:
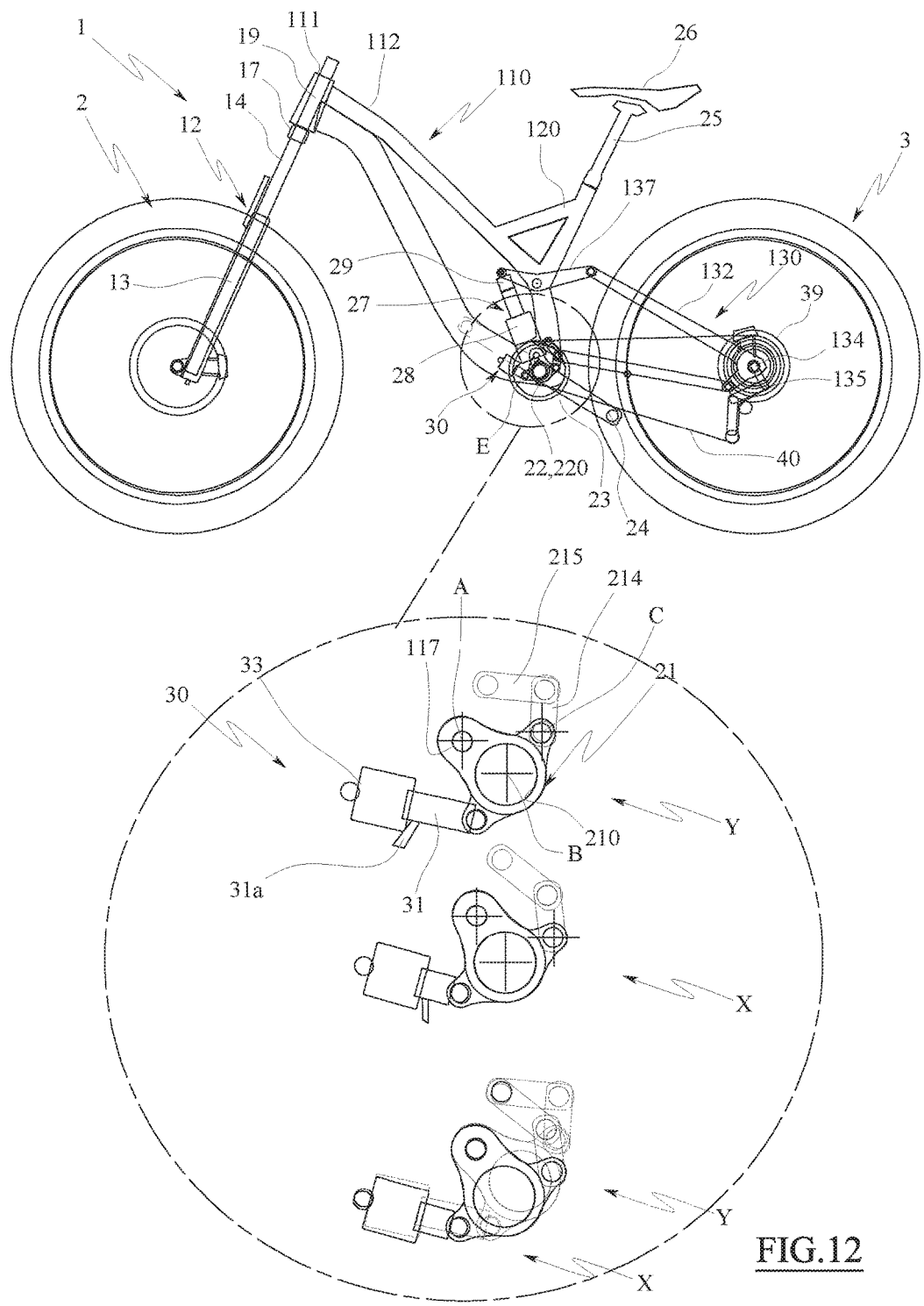
FIGS. 12-14 are schematic views (provided with larger-scale representations relating to the zone of the bottom bracket) of further three embodiments of a bicycle according to the invention.
Figure 13:
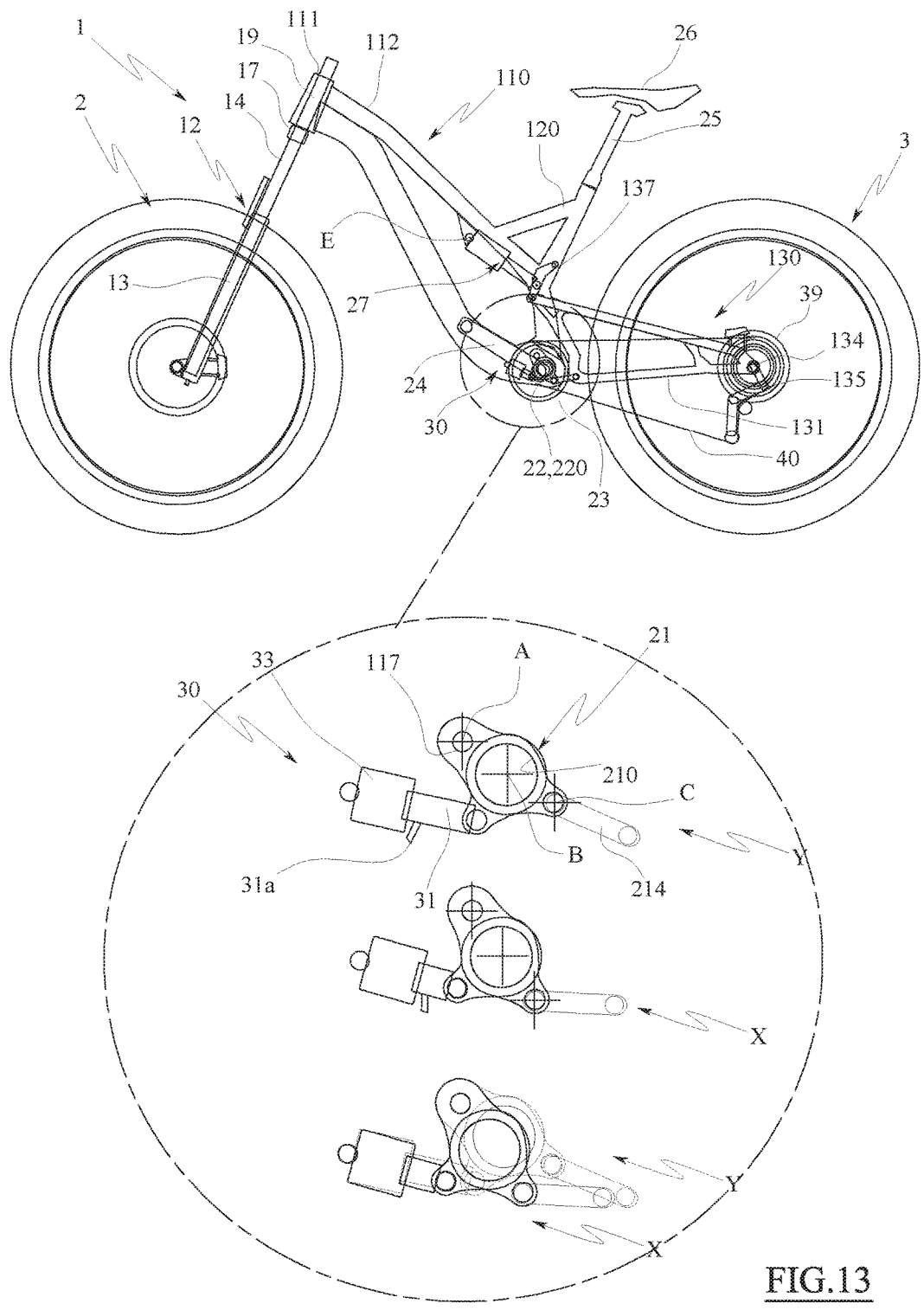
Figure 14:
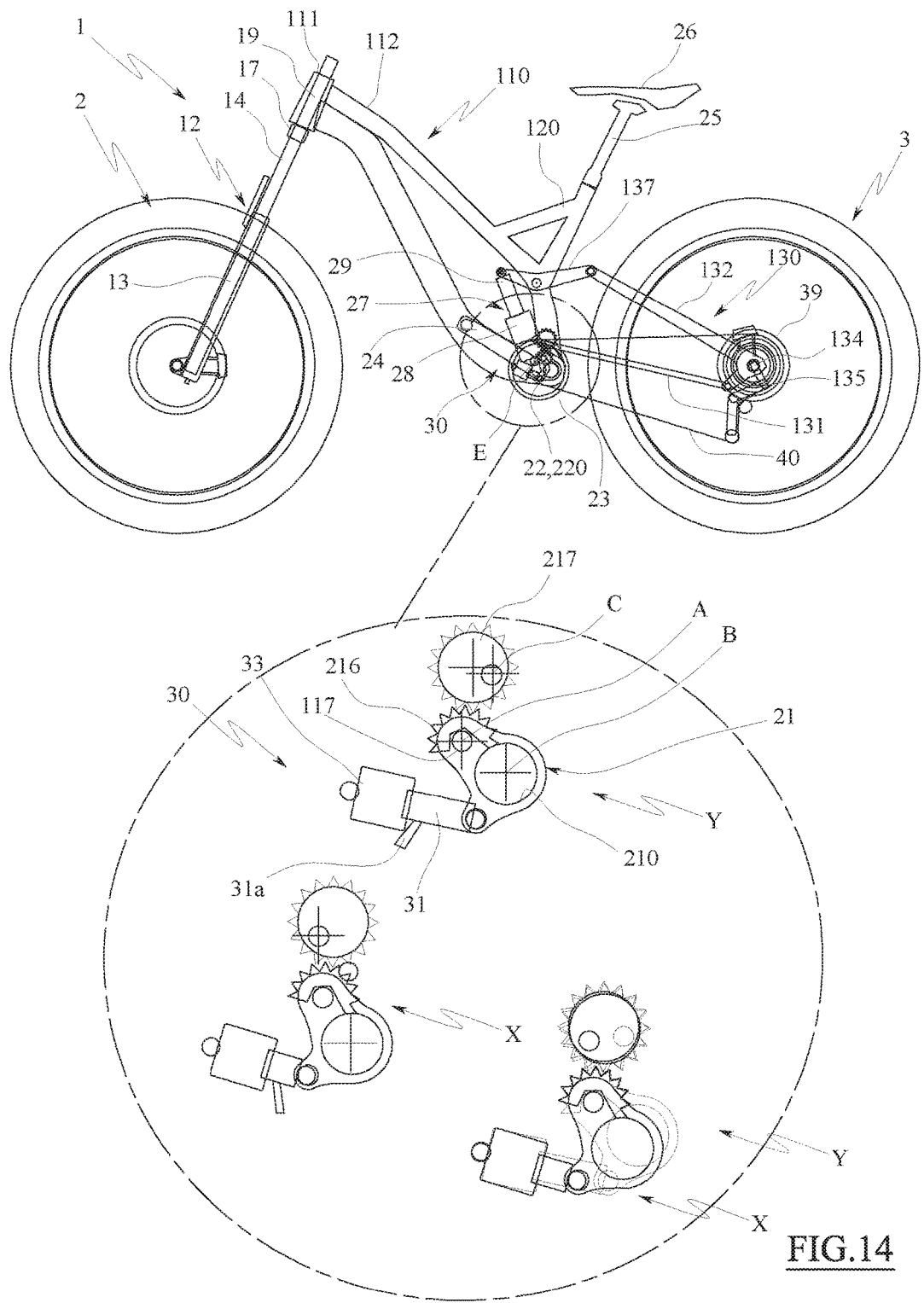

In further embodiments, illustrated in FIGS. 12-14, the body 21 is hinged to the front triangle 110 with respect to a first axis of revolution A offset and parallel to the first rotation axis B of the bottom bracket 22.

All the parts having the same reference numerals are identical to those described in the foregoing in reference to the first embodiment or have an identical or equivalent function and, even though not all the above-described constructional details of the bicycle 1 are not literally mentioned, they must be considered to be included in these further embodiments illustrated in FIG. 12-14.

In practice, the body 21 comprises the cylindrical first housing 210, the axis of which, defining the first rotation axis B of the bottom bracket 22, is perpendicular to plane YZ.

The rotation spindle 220 of the bottom bracket 22 is housed, coaxially and substantially fit, internally of the first housing 210 of the body 21, and is rotatably associated thereto about the first rotation axis B coinciding with the axis of the first housing 210.

The body 21 is therefore configured to oscillate with respect to the front triangle 110 about the first axis of revolution A between two stop positions X and Y, for example predefined, which configure two respective configurations of the bicycle 1 with different bicycle geometry. In the example the first stop position X configures a front (and lower) stop of the body 21 and the second position Y defines a rear (and upper) stop of the body 21.

For example, the front triangle 110 can comprise abutting elements, for example damped, able to come into contract with the body 21 so as to define the stops in the stop positions X, Y.

The actuator and the blocking group are interposed between the front triangle 110 and the body 21 for operating the body 21 between one stop position X and the other stop position Y, for example towards one of the two stop positions X and Y, and for blocking the body 21 in any position between the first stop position X and the second stop position Y or any intermediate position there-between. In the illustrated example, the actuator and the blocking group are defined by the above-described hydraulic/pneumatic cylinder 30 illustrated in FIGS. 8 and 11, in which one of the cylinder 33 and the slider 31 (in the example the cylinder 33) is hinged (with respect to a hinge axis parallel to the first rotation axis B) to the front triangle 110 and the other one of the slider 31 and the cylinder 33 (in the example the slider 31) is hinged to the body 21, with respect to a hinge axis parallel to the first rotation axis B and for example offset thereto.

In the embodiment illustrated in FIG. 12, the rear frame 130, i.e. the front end of the first link 131, can be articulated to the body 21, rotatably about the second rotation axis C, parallel (and offset) with respect to the first rotation axis B, by interposing an extending link 214 (a first end of which is hinged to the body 21 and a second end of which is hinged to the first link 131).

The second end of the extending link 214 is hinged to an articulating link 215, which is hinged in turn to the front triangle 110 relative to a parallel and offset oscillating axis (offset also in relation to the first axis of revolution A).

In the embodiment illustrated in FIG. 13, the rear frame 130 can be articulated to the body 21, rotatably about the second rotation axis C, parallel (and offset) with respect to the first rotation axis B, by interposing an extending link 214, a first end of which is hinged to the body 21 and a second end of which is hinged to the rear frame 130 (which does not include the first link 131).

In the further embodiment shown in FIG. 14, the body 21 might include a gearing portion 216, concentric to the first axis of revolution A, which enmeshes a further gearing 217 rotatably connected to the front triangle 110, with respect to a axis of revolution parallel and offset with respect to the first axis of revolution A.

The rear frame 130, i.e. the front end of the first link 131, can be articulated to the body 21, being hinged to the further gearing 217 about the second rotation axis C, parallel and offset with respect to the first rotation axis B and parallel and offset with respect to the axis of revolution of the further gearing 217.

In these embodiments shown in figures from 11 to 14, at least one of the slider 29 and the body 28 of the shock-absorber 27, in the illustrated example the free end of the slider 29, is hinged (about a hinge axis perpendicular to the plane YZ) to the rear frame 130 (i.e. the third link 137, for example to the free front end thereof, i.e. the end opposite the rear end hinged to the rear forks 132 with respect to the sixth rotation axis G thereof).

The other one of the body 28 and the slider 29, in the example the body 28 (for example the end thereof opposite to the slider 29) is rotatably associated (about a hinge axis perpendicular to the plane YZ) to the front triangle 110, for example rotatably about a fifth rotation axis E parallel and offset with respect to the first axis of revolution A (even though it is possible for it to be rotatably associated to the body 21 as disclosed in the embodiments illustrated in FIGS. 1-10).

The Y-shaped plate can alternatively be rotatably associated to the front triangle 110 about the first axis of revolution A, which can be positioned at the intersection zone of the three Y-profiled arms.

The bottom bracket 22 can be rotatably associated to the first arm of the plate about the first rotation axis B, which can be positioned near the end of the first arm.

The rear frame 130 can be articulated to the second arm of the plate, rotatably around the second rotation axis C, which can be positioned near the end of the second arm opposite to the intersection end with the other arms.

The saddle post 120 can be articulated to the second arm of the plate, rotatably about the fourth rotation axis D, which can be positioned near the end of the third arm.

The shock absorbing element 27 can be rotatably associated to the third arm of the Y shaped plate about the fifth rotation axis E, which can for example coincide with the fourth rotation axis D.

In a further embodiment, mentioned at the beginning of the present description, the body 21 that is mobile with respect to the frame 100 and connected thereto, which supports the rear frame 130 and/or the bottom bracket 22 and/or the saddle post 120, for example as described in the foregoing for the main embodiment, can for example be defined by a slider that is slidably associated to the front triangle 110.

The sliding can be guided by an appropriate guide element along a trajectory (for example straight and/or directed with a prevalent horizontal component, meaning as "horizontal" a plane parallel to the rest plane of the bicycle 1 wheels) lying on plane YZ.

The bottom bracket 22 can be rotatably associated to the slider about the first rotation axis B perpendicular to the plane YZ and the rear frame 130 can also be articulated to the cursor about the second rotation axis C, offset and parallel with respect to the first rotation axis B.

Further, the saddle post 120 can also be hinged to the slider about the fourth rotation axis D, which can be parallel and offset with respect to the rotation axes B and C.

Further, the shock absorbing element 27 can also be rotatably associated to the slider about the fifth rotation axis E, which can be parallel and offset with respect to the rotation axes B and C and offset or also coinciding with respect to the fourth rotation axis D.

The slider would be moved in translation between the opposite stop positions (forward and backward) and blocked in any of the stop positions or in any intermediate position between the stop positions, respectively by activating means and blocking means such as those described in the foregoing for the preceding embodiments of the invention.

The bicycle 1 functions as follows.

When the bicycle 1 is in the downhill configuration, i.e. the body 21 is in the first stop position X, and a pedalable course (flat or uphill) is to be ridden, the actuator and/or the blocking group are activated in order to move the body 21 from the first stop position X (FIGS. 1 and 7 and FIGS. 11-14) to the second stop position Y (FIGS. 2 and 8 and FIGS. 11-14).

Moving from the first stop position X to the second stop position Y, the second rotation axis C, and therefore the attachment position of the first link 131 to the body 21, displaces forwards and downwards with respect to the first seating 117 (i.e. with respect to the front triangle 110); consequently the first link 131 transmits the lowering forwards to the rear fork 132, rotating the rear fork 132 in an anticlockwise direction about the point in which it is pivoted to the third link 137, which third link 137 in turn is pulled by the rear fork 132 and rotates about the hinge point thereof with the front triangle 110.

As a consequence of these variations the wheelbase of the bicycle 1, i.e. the distance between the rotation axis of the front wheel 2 and the rotation axis of the rear wheel 3, shortens and the steering tube 111 increases the inclination thereof with respect to the horizontal (rest plane to the terrain), all factors that make the bicycle 1 more reactive; further, the front triangle 110 rises, so that it is less likely that obstacles will be struck by the pedals or the lower tube 113 and the centre of gravity of the bicycle 1 rises and displaces forward.

Further, moving from the first stop position X to the second stop position Y, the first rotation axis B, and therefore the position of the rotation axis of the bottom bracket 22, displaces forward and downward with respect to the front triangle 110 which, by causing the raising of the front triangle 110 with respect to the rest plane defined by the terrain, has as a result of having a bottom bracket 22 which in the second stop position Y is at a greater height from the terrain with respect to when it is in the first stop position X and displaced forwards towards the front wheel 2.

Further, rotating from the first stop position X to the second stop position Y, the fourth rotation axis D, therefore the attachment position of the second link 121 to the body 21, displaces rearwards and upwards with respect to the first seating 117 and, therefore, to the front triangle 110, and therefore the second link 121 causes the rotation of the saddle post 120 in an anticlockwise direction about the first swinging axis F.

This displacement has the effect of bringing the saddle 26, when the body 21 is in the second stop position Y, into a higher and more forward position with respect to when the body 21 is in the first stop position X.

The contemporary advancing of the saddle 26 and the bottom bracket 22 guarantees the correct relative positioning between the saddle 26 and cranks 24, and therefore the pedals, for an effective pedaling position for the cyclist.

Additionally, moving from the first stop position X to the second stop position Y, the fifth rotation axis E, therefore the attachment position of the shock absorbing element 27 to the body 21, displaces rearwards and upwards with respect to the first seating 117 and, therefore, the front triangle 110, this displacement brings the shock absorbing element 27 to work in a less favorable position from the hydraulic/pneumatic point of view and makes it more rigid against vertical stresses and therefore more favorable to the pedaling action.

The blocking group is such as to stably block the body 21 in the second stop position Y (or in any intermediate position between the first stop position X and the second stop position Y, as desired), with respect to the front triangle 110 during the running of the bicycle 1, which will then be able to run a pedalable course in the more suitable stable and blocked configuration.

Vice versa, when the bicycle 1 is in the pedaling configuration and a downhill ride is to be undertaken, the blocking group (and/or the actuator) is activated so as to enable the return (for example spontaneous or under the force of gravity) of the body 21 from the second stop position Y to the first stop position X.

Moving from the second stop position Y to the first stop position X, the second rotation axis C, and therefore the attachment position of the first link 131 to the body 21, displaces rearwards and upwards with respect to the first seating 117 (i.e. with respect to the front triangle 110); consequently the first link 131 transmits the raising rearwards to the rear fork 132, rotating the rear fork 132 in a clockwise direction about the point in which it is pivoted to the third link 137, which third link 137 in turn is pulled by the rear fork 132 and rotates about the hinge point thereof with the front triangle 110.

As a consequence of these variations the interaxis of the bicycle 1, i.e. the distance between the rotation axis of the front wheel 2 and the rotation axis of the rear wheel 3, lengthens and the steering tube 111 reduces the inclination thereof with respect to the horizontal (rest plane to the terrain), all factors that make the bicycle 1 more stable; further, the front triangle 110 drops, displacing the centre of gravity of the bicycle 1 lower and towards the rear.

Further, moving from the second stop position Y to the first stop position X, the first rotation axis B, and therefore the position of the rotation axis of the bottom bracket 22, displaces rearward and upward with respect to the front triangle 110, this displacement, causing the lowering of the front triangle 110, results in a bottom bracket 22 which in the first stop position X is at a lower height from the terrain with respect to when it is in the second stop position Y and displaced rearwards towards the rear wheel 3.

Further, moving from the second stop position Y to the first stop position X, the fourth rotation axis D, therefore the attachment position of the second link 121 to the body 21, displaces forwards and downwards with respect to the first seating 117 and, therefore, to the front triangle 110; therefore the second link 121 causes the rotation in an anticlockwise direction about the first swinging axis F of the saddle post 120.

This displacement has the effect of bringing the saddle 26, when the body 21 is in the first stop position X, in a lower and more rearward position with respect to when the body 21 is in the second stop position Y, enabling the rearward displacing of the center of gravity of the cyclist and thus determining a geometry of the bicycle 1 that is less likely to tilt forwards.

The contemporary retracting of the saddle 26 and the bottom bracket 22 guarantees the correct relative positioning between the saddle 26 and pedals for an effective pedaling position for the cyclist.

Additionally, moving from the second stop position Y to the first stop position X, the fifth rotation axis E, therefore the attachment position of the shock absorbing element 27 to the body 21, displaces forwards and downwards with respect to the first seating 117 and, therefore, the front triangle 110, this displacement brings the shock absorbing element 27 to work in a more favorable position for the absorbing of the roughness of the terrain.

The blocking group is such as to stably block the body 21 also in the first stop position X with respect to the front triangle 110 during the running of the bicycle 1, which can therefore undertake a descent in the most suitable stable configuration.

The invention as it is conceived is susceptible to numerous modifications, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

The invention claimed is:

1. A bicycle frame (100) comprising:
   a front triangle (110);
   a rear frame (130) articulated to the front triangle (110);
   a body (21) associated to the front triangle (110) and mobile with respect to the front triangle (110);
   a bottom bracket (22) rotatably associated to the body (21) about a first rotation axis (B) and displaceably connected to the front triangle (110) along a trajectory by means of a movement of the body (21) with respect to the front triangle (110);
   wherein the rear frame (130) is articulated to the body (21) about a second rotation axis (C) parallel to the first rotation axis (B).

2. The frame (100) of claim 1, wherein the body (21) comprises a revolving body rotatably associated to the front triangle (110) about an axis of revolution (A), the first rotation axis (B) and the second rotation axis (C) being parallel and offset with respect to the axis of revolution (A).

3. The frame (100) according to claim 1, wherein the body (21) is mobile alternatively between a first stop position (X) and a second stop position (Y).

4. The frame (100) of claim 3, comprising an actuator (30, 34) configured to move the body (21) with respect to the front triangle (110) between the first stop position (X) and the second stop position (Y).

5. The frame (100) of claim 3, further comprising a blocking group (30,34) configured to stop the body (21) in at least one of the first stop position (X) and the stop second position (Y) and any intermediate position therebetween.

6. The frame (100) of claim 1, wherein the body (21) is articulated to the front triangle (110) by means of two connecting rods (123, 123'), forming a four-bar linkage.

7. The frame (100) of claim 1, wherein a first link (131) is interposed between the body (21) and the rear frame (130), wherein the first link (131) is hinged to the body (21).

8. The frame (100) of claim 1, comprising a saddle post (120) articulated to the body (21) rotatably about a fourth rotation axis (D).

9. The frame (100) of claim 8, wherein the fourth rotation axis (D) is parallel and offset with respect to the axis of revolution (A) and/or with respect to the first rotation axis (B).

10. The frame (100) of claim 8, wherein a second link (121) is interposed between the saddle post (120) and the body (21), wherein the second link (121) is hinged to the body (21) with respect to the fourth rotation axis (D).

11. The frame (100) of claim 8, wherein the saddle post (120) is swinging associated to the front triangle (110) about a first swinging axis (F) parallel to the first rotation axis (B) and offset with respect thereto.

12. The frame (100) of claim 1, further comprising a shock absorbing element (27) interposed between the front triangle (110) and the rear frame (130), wherein the shock absorbing element (27) is arranged to damp the oscillations of the rear frame (130) with respect to the front triangle (110).

13. The frame (100) of claim 12, wherein the shock absorbing element (27) comprises a cylindrical body (28) and a slider (29) that is slidable with respect to the cylindrical body (28), wherein one of the cylindrical body (28) and the slider (29) is rotatably hinged to the body (21) or to the front triangle (110) about a fifth rotation axis (E) parallel to the first rotation axis (B).

14. The frame (100) of claim 13, wherein the other of the slider (29) and the cylindrical body (28) of the shock absorbing element (27) is articulated to the rear frame (130).

15. The frame (100) of claim 13, wherein the rear frame (130) is articulated to the shock absorbing element (27) by means of a third link (137) rotatably associated, in an intermediate point thereof, to the front triangle (110) about a sixth rotation axis (G) parallel to the fifth rotation axis (E), and hinged, in points of the third link (137) opposite with respect to the intermediate point, respectively to the rear frame (130) and the shock absorbing element (27).

* * * * *